United States Patent
Carley

(10) Patent No.: US 7,886,340 B2
(45) Date of Patent: Feb. 8, 2011

(54) SECURE REMOTE MANAGEMENT APPLIANCE

(75) Inventor: Jeffrey Alan Carley, Colorado Springs, CO (US)

(73) Assignee: Engedi Technologies, Virginia Beach, VA (US)

( * ) Notice: Subject to any disclaimer, the term of this patent is extended or adjusted under 35 U.S.C. 154(b) by 118 days.

(21) Appl. No.: 12/352,161

(22) Filed: Jan. 12, 2009

(65) Prior Publication Data

US 2009/0150977 A1 Jun. 11, 2009

Related U.S. Application Data

(63) Continuation of application No. 10/461,827, filed on Jun. 13, 2003, now Pat. No. 7,496,950.

(51) Int. Cl.
*G06F 15/16* (2006.01)

(52) U.S. Cl. .................. 726/3; 726/6; 726/11; 726/14; 709/220; 709/223; 709/238

(58) Field of Classification Search .................. 726/11, 726/3, 6, 14; 709/220, 238, 223
See application file for complete search history.

(56) References Cited

U.S. PATENT DOCUMENTS

| | | |
|---|---|---|
| 5,684,957 A | 11/1997 | Kondo et al. |
| 5,689,566 A | 11/1997 | Nguyen |
| 5,761,428 A | 6/1998 | Sidey |
| 5,764,886 A * | 6/1998 | Danielson et al. ............. 714/47 |
| 5,848,161 A | 12/1998 | Luneau et al. |
| 5,907,862 A | 5/1999 | Smalley |
| 5,968,176 A | 10/1999 | Nessett et al. |
| 6,055,575 A | 4/2000 | Paulsen et al. |
| 6,079,020 A | 6/2000 | Liu |
| 6,085,243 A | 7/2000 | Fletcher et al. |
| 6,108,713 A | 8/2000 | Sambamurthy et al. |
| 6,108,782 A | 8/2000 | Fletcher et al. |
| 6,148,337 A | 11/2000 | Estberg et al. |
| 6,189,102 B1 | 2/2001 | Beser |
| 6,205,466 B1 | 3/2001 | Karp et al. |
| 6,243,815 B1 | 6/2001 | Antur et al. |
| 6,304,973 B1 | 10/2001 | Williams |
| 6,335,927 B1 | 1/2002 | Elliott et al. |
| 6,343,320 B1 | 1/2002 | Fairchild et al. |
| 6,366,585 B1 | 4/2002 | Dapper et al. |
| 6,408,392 B2 | 6/2002 | White |
| 6,424,647 B1 * | 7/2002 | Ng et al. ...................... 370/352 |
| 6,446,200 B1 | 9/2002 | Ball et al. |
| 6,456,306 B1 | 9/2002 | Chin et al. |

(Continued)

OTHER PUBLICATIONS

Jaehong Park et al.; Towards Usage Control Models: Beyond Traditional Access Control.

(Continued)

*Primary Examiner*—Thanhnga B Truong
(74) *Attorney, Agent, or Firm*—Thomas & Karceski, PC

(57) ABSTRACT

A computer network management system with an embedded processor, an analog communication means and a digital interface for network management provides a system for remotely and securely managing a network. Backup power in the form of an uninterrupted power supply, or other power means as appropriate, allows the modem to provide power outage notification to a remote site. The system further provides authentication and authorization capabilities for security purposes.

21 Claims, 41 Drawing Sheets

U.S. PATENT DOCUMENTS

| | | | |
|---|---|---|---|
| 6,473,863 | B1 | 10/2002 | Genty et al. |
| 6,480,955 | B1 | 11/2002 | Dekoning et al. |
| 6,484,261 | B1 | 11/2002 | Wiegel |
| 6,496,858 | B1 | 12/2002 | Frailong et al. |
| 6,553,416 | B1 | 4/2003 | Chari et al. |
| 6,560,222 | B1 | 5/2003 | Pounds et al. |
| 6,578,042 | B2 | 6/2003 | Arrouye et al. |
| 6,601,084 | B1 | 7/2003 | Bhaskaran et al. |
| 6,651,190 | B1 | 11/2003 | Worley et al. |
| 6,654,796 | B1 | 11/2003 | Slater et al. |
| 6,654,891 | B1 | 11/2003 | Borsato et al. |
| 6,662,221 | B1 | 12/2003 | Gonda et al. |
| 6,678,826 | B1 | 1/2004 | Kelly et al. |
| 6,678,827 | B1 | 1/2004 | Rothermel et al. |
| 6,684,241 | B1 | 1/2004 | Sandick et al. |
| 6,697,947 | B1 | 2/2004 | Matyas, Jr. et al. |
| 6,700,890 | B1 | 3/2004 | Langley et al. |
| 6,711,613 | B1 | 3/2004 | Ewing et al. |
| 6,751,677 | B1 | 6/2004 | Ilnicki et al. |
| 6,754,831 | B2 | 6/2004 | Brownell |
| 6,757,297 | B1 | 6/2004 | Chin |
| 6,859,841 | B2 | 2/2005 | Narad et al. |
| 6,894,994 | B1 | 5/2005 | Grob et al. |
| 6,894,999 | B1 * | 5/2005 | Acharya ............... 370/352 |
| 6,970,924 | B1 | 11/2005 | Chu et al. |
| 6,973,491 | B1 | 12/2005 | Staveley et al. |
| 6,982,953 | B1 | 1/2006 | Swales |
| 7,024,695 | B1 | 4/2006 | Kumar et al. |
| 7,028,228 | B1 | 4/2006 | Lovy et al. |
| 7,099,934 | B1 | 8/2006 | Ewing et al. |
| 7,231,661 | B1 | 6/2007 | Villavicencio et al. |
| 7,457,858 | B1 | 11/2008 | Levesque |
| 2001/0056548 | A1 | 12/2001 | Blumberg |
| 2002/0001302 | A1 | 1/2002 | Pickett |
| 2002/0029337 | A1 | 3/2002 | Sudia et al. |
| 2002/0052950 | A1 | 5/2002 | Pillai et al. |
| 2002/0057018 | A1 | 5/2002 | Branscomb et al. |
| 2002/0064149 | A1 | 5/2002 | Elliott et al. |
| 2002/0078301 | A1 | 6/2002 | Burnett |
| 2002/0116485 | A1 | 8/2002 | Black et al. |
| 2002/0133708 | A1 | 9/2002 | Gudorf et al. |
| 2002/0162005 | A1 | 10/2002 | Ueda et al. |
| 2002/0165961 | A1 | 11/2002 | Everdell et al. |
| 2003/0023854 | A1 | 1/2003 | Novak et al. |
| 2003/0041136 | A1 | 2/2003 | Cheline et al. |
| 2003/0088513 | A1 | 5/2003 | Gritzmacher et al. |
| 2003/0093244 | A1 | 5/2003 | Corlett et al. |
| 2003/0093563 | A1 | 5/2003 | Young et al. |
| 2003/0097444 | A1 | 5/2003 | Dutta et al. |
| 2003/0156740 | A1 | 8/2003 | Siegel et al. |
| 2003/0221011 | A1 | 11/2003 | Shitano |
| 2004/0003071 | A1 | 1/2004 | Mathew et al. |
| 2004/0104266 | A1 | 6/2004 | Bolle et al. |
| 2004/0153552 | A1 | 8/2004 | Trossen et al. |

OTHER PUBLICATIONS

Ravi Sandhu et al.; Usage Control: A Vision for Next Generation Access Control.

Gail-Joon Ahn et al.; Role-based Authorization Constraints Specification; ACM Transactions on Information and System Security, vol. 3, No. 4, Nov. 2000, pp. 207-226.

Hardware you need FAST; Symbiat (online); Copyright 2002; pp. 1-2 specifically p. 1.

Hari Harikrishnan. Advanced security for data, voice and video access ideal for small offices and teleworkers; introducing Cisco 836 and SOHO 96 Secure Broadband Routers, Cisco.com: Mar. 2003; pp. 1-14, specifically pp. 4, 6 & 10.

PCT Search Report and Written Opinion; Application No. PCT/US04/34707; date of mailing Jul. 8, 2008; 7 pages.

A Model for Multilevel Security in Computer Netwroks; Lu et al.; IEEE Transactions on Software Engineering, vol. 16., No. 6; Jun. 1990; pp. 647-659; 13 pages.

Better Security via Smarter Devices; Ganger et al.; 2001 IEEE, pp. 100-105; 6 pages.

USPTO Office Action; U.S. Appl. No. 10/461,820; date mailed Jul. 5, 2005.

USPTO Office Action; U.S. Appl. No. 10/461,820; date mailed Feb. 24, 2006.

USPTO Office Action; U.S. Appl. No. 10/461,820 date mailed Jun. 9, 2004.

USPTO Office Action; U.S. Appl. No. 10/969,561; date mailed Nov. 2, 2006.

USPTO Office Action; U.S. Appl. No. 10/461,827; date mailed Mar. 26, 2008.

USPTO Office Action; U.S. Appl. No. 10/461,827; date mailed Oct. 3, 2007.

USPTO Office Action; U.S. Appl. No. 10/461,827; date mailed Nov. 28, 2006.

USPTO Office Action; U.S. Appl. No. 10/461,827; date mailed May 8, 2006.

USPTO Office Action; U.S. Appl. No. 10/461,827; date mailed Oct. 5, 2008.

USPTO Office Action; U.S. Appl. No. 11/611,210; date mailed Jul. 20, 2009.

USPTO Office Action; U.S. Appl. No. 11/946,976; date mailed Oct. 1, 2010, 24 pages.

USPTO Office Action; U.S. Appl. No. 11/611,210; date mailed Oct. 8, 2010, 24 pages.

USPTO Office Action; U.S. Appl. No. 12/394,342; date mailed Jul. 1, 2010, 14 pages.

* cited by examiner

SECURE REMOTE MANAGEMENT APPLIANCE

CROSS-REFERENCE TO RELATED APPLICATIONS

This application is a continuation of U.S. patent application Ser. No. 10/461,827, filed Jun. 13, 2003, which in turn claims the benefit of U.S. Provisional Application No. 60/388,287, filed Jun. 13, 2002, and U.S. Provisional Application No. 60/438,282, filed Jan. 6, 2003. The present invention is related to the invention described in co-owned U.S. Pat. No. 7,171,467, filed on Jun. 13, 2003 and issued on Jan. 30, 2007, which is incorporated herein by reference. The present invention is also related to the invention described in co-owned U.S. Pat. No. 7,325,140, filed on Oct. 20, 2004 and issued on Jan. 29, 2008, which is incorporated herein by reference. The present invention is also related to the invention described in co-owned and co-pending U.S. patent application Ser. No. 11/611,210, filed on Dec. 15, 2006, which is incorporated herein by reference. The present invention is also related to the invention described in co-owned and co-pending U.S. patent application Ser. No. 11/946,976, filed on Nov. 29, 2007, which is incorporated herein by reference.

FIELD OF THE INVENTION

The present invention relates in general to methods and apparatus used in managing devices or elements in a communication network and more particularly to methods and apparatus for remote management of these devices or elements in a secure manner.

BACKGROUND OF THE INVENTION

In computer networks with distributed networking elements such as routers and switches, the vast majority of the networking elements are not in the same geographic location or easily accessible by the skilled technicians or network administrators typically responsible for normal maintenance of the elements. Not only do these technicians and administrators require regular access to the network elements for maintenance, but they also need timely access to the network elements when problems arise in order to perform trouble shooting and resolving problems. The more quickly a network administrator can access the elements in the network for troubleshooting the shorter the mean-time-to-repair (MTTR) an outage in the network.

In general, it is not practical to require physical access to the network elements for general maintenance or troubleshooting and repair. The costs would be prohibitive, both in time and personal, to require a skilled technician to be dispatched for every required activity on an element. This has driven a strong requirement to provide for remote management of network elements. A number of means have been developed to provide for remote management of the network elements. Remote management of the elements can be provided in-band (the remote administrator communicates with the network element using the network of which the element is a part) or out-of-band (the remote administrator communicates with the network element using a means other than the network of which the network element is a part). Typically, when out-of-band remote management is utilized, the administrator is connecting to a console or management port on the network elements.

However, the security of the network elements is a concern when remote management is allowed. For a network element to be secure, it must first of all be physically secure from attack. Without physical security, it is almost certain an attacker can compromise a network element. If management of the element requires physical access to the element then the security of the management is as strong as the physical security. But, as stated above, in most networks this is not practical. It is important though, to realize that opening up a device to remote management allows a larger window for attackers to utilize in an attack. The use and security of remote management must be carefully considered.

The struggle to find a workable compromise between the utility of remote management of network elements and the need to maintain the security of the network elements can clearly be seen in "The Router Security Configuration Guide" published by the National Security Agency. On page 49 of the guide it is recommended that a terminal (or computer) be a stand-alone device protected from unauthorized access. This goes back to requiring physical access to the network element in order to access the console or management port. On page 47 the guide also states, "Permitting direct dial-in to any vital piece of network infrastructure is potentially very risky . . . " In-band management methods often depend to one degree or another on the security of the network the element is a part of to protect the management traffic. While this might provide a reasonable level of protection from external attacks (initiated from outside the network), it generally will not provide a sufficient level of protection from an internal attack (initiated from inside a network). To help reduce the vulnerability to internal attack, the "The Router Security Configuration Guide" has recommendation using a dedicated network or at least dedicated network segments for remote network administration of routers. Building out a dedicated network for management would be quite expensive for most networks.

There are definite advantages to having an out-of-band remote management connection to network elements that utilize connectivity that is diverse from the primary network connection. One of the primary purposes of the remote management connection is to assist the remote administrator or technician in troubleshooting network problems. With in-band management, if a network problem has hindered connectivity to a network element, management connectivity to that element could be lost when it is needed the most. An out-of-band management solution is more likely to allow the administrator or technician to still remotely access the network element to troubleshoot and resolve the network problem in a timely manor. Also, the out-of-band management connection providing connectivity to the console or management port of an element might be available for the initial configuration of the device whereas an in-band management connection might not be available for initial configuration. It is also possible that some functions can only be performed using the console or management port of the element. An example of this would be Password Recovery on a Cisco router. While a dedicated and secure out-of-band network would be the most preferable solution for out-of-band management from a security standpoint, the cost of such a solution is generally prohibitive. While some form of public shared network, such as the Public Switched Telephone Network (PSTN) or an Integrated Services Digital Network (ISDN) provides the most cost effective solution for a diverse out-of-band connection, the security of such solutions is a major concern.

The most straightforward means of providing out-of-band connectivity to a network element is to place a modem on the console port of a networking element connecting it to the PSTN. However, any perimeter security for the network such as firewalls and access-lists has just been completely bypassed providing a vulnerable point for intruders to attack. If an attacker knows or can determine the phone number of the modem then the only security is the logon protection on the networking element itself. War dialers will generally find phone numbers connected to modems.

It is important to realize that most protocols used for assisting in the remote management of network elements do not provide for the confidentiality or integrity of the information being transmitted between the remote administrator and the network element or strong authentication of the parties involved. This is especially critical if a public shared network such as the PSTN is utilized for the out-of-band connectivity. For instance, the protocol most frequently utilized for remote login to network elements (Telnet) transmits traffic in the clear (any one who can tap into or sniff the network can capture and understand the traffic). It would not be uncommon for a remote administrator to be transmitting passwords and device configurations over such a connection. If an attacker were able to insert himself in the middle of such a connection, even more attacks would be possible.

Maintenance and troubleshooting of network element problems can often be facilitated by the element having the element maintain an accurate time clock. One way of keeping the clock accurate on an element is to allow the network to set the clock utilizing a protocol such as Network Time Protocol (NTP). If an attacker were able to alter or interfere with NTP, the smooth operation of the network could be interfered with.

Some network elements utilize Hypertext Transfer Protocol (HTTP) or Hypertext Transfer Protocol over Secure Socket Layer (HTTPS) for managing the network element. HTTP transmits information in the clear and is susceptible to impersonation and data compromise. Often HTTPS is only authenticating the server to the client. For remote management, mutual authentication can be important.

A common difficulty in maintaining the elements of a network is keeping the software on the elements updated with patches that protect them from new exploits by hackers and crackers. One of the functions of firewalls is to protect the elements behind them from the exploits so that it is not as critical to keep protected elements updated. However, this does require the firewalls to be updated regularly to protect the elements from new exploits. Keeping the firewalls updated can be difficult.

An object of the invention is to utilize standard packet filtering firewall methods to restrict access to the management interfaces based on factors such as the source address of the connection request.

Another object of the invention is to use strong authentication to verify the identity of the user and restrict access based on the identity of the user.

Another object of the invention is to use an Access Control Server (ACS) to allow for centralized authentication and authorization of users as well as to log accounting information.

Another object of the invention is to restrict functions and protocols allowed to access the management interfaces to those necessary for remote management of that network element.

Another object of the invention is to dynamically update the rules used for restricting access to the management interfaces.

Another object of the invention is to protect the console port from privilege hijacking.

Another object of the invention is to provide for the confidentiality and integrity of the information transmitted between the remote administrator and the management interfaces.

Another object of the invention is to monitor the management ports and the network connections the SRMA utilizes for proper functioning and alert management software upon failure.

Another object of the invention is to monitor connections for possible attacks and report possible attacks to Intrusion Detection System management software.

Another object of the invention is to build a secure connection to a network providing network services both over an in-band connection and over an out-of-band connection.

Another object of the invention is to access network services such as ACS, DNS, NTP, Network Management Stations, Logging Servers, and Intrusion Detection Systems management stations over either an in-band network connection or an out-of-band network connection (or both) and dynamically switch between which network is being utilized for the service.

Another object of the invention is to allow a remote administrator or technician to access the management interfaces via either an in-band connection or an out-of-band connection (or both).

Yet another object of the invention is to provide auditing information about attempted connections (successful and unsuccessful) to the management interfaces.

Yet another object of the invention is to alert management software on unsuccessful attempt to connect to management interfaces.

Yet another object of the invention is to provide for protocol conversion between the connection from the remote administrator to the SRMA and from the SRMA to the network element over the management interface.

Yet another object of the invention is to protect the management interfaces from HTTP and HTTPS attacks and authenticate an HTTP/S client.

Yet another object of the invention is to be managed through the in-band connection, the out-of-band connection, or the SRMA console port.

A further object of the invention is to be managed using a command line interface or using HTTPS.

A further object of the invention is to be configured to automatically check for updates to the SRMA software or protection database.

A further object of the invention is to provide the end-point for an in-band or out-of-band connection from the SRMA to the network providing network services which connection can be secured using protocols such as IPSec or may be unsecured.

A further object of the invention is to provide the ability to switch the path being utilized for network services, in particular, the SRMA will be able to utilize an in-band connection for network services when available and switch to using an out-of-band connection for network services when it is not available.

A further object of the invention is to provide a proxy firewall for a command line interface (CLI) via an in-band connection or an out-of-band connection from the remote administrator to the SRMA. All connections to the management interface of the managed device must go through the SRMA. This CLI proxy provides user authentication by whatever means are configured (possibly utilizing a centralized authentication server); the ability to restrict certain commands from being executed; command spoofing from the SRMA to the device being managed (as in spoofing a logoff command when the console connection is disconnected); a secure connection from the remote administrator's network to the SRMA utilizing protocols such as IPSec or SSH; and customized features based upon the device being managed.

Finally, it is an object of the present invention to accomplish the foregoing objectives in a simple and cost effective manner.

BRIEF SUMMARY OF THE INVENTION

The present invention addresses the foregoing problems, as well as other problems, by providing an exemplary embodiment of a Secure Remote Management Appliance™ (SRMA). In this preferred exemplary embodiment, the SRMA is implemented as a stand-alone appliance; however, this is not intended to limit the implementation of these features to a stand-alone appliance. These features also can be combined with other hardware and software features such as being integrated with a modem or with the console of a device. Some of the features of the SRMA can also be implemented separately. Such implementations would still be within the spirit and scope of this invention.

The primary purpose of the SRMA is to provide a firewall to protect the network element interfaces used for remotely managing the element from attack. In particular, the SRMA is intended to protect the console or management port of a network element and to protect network segments dedicated to network management.

The SRMA allows the use of shared networks including public networks such as the Internet, the PSTN, or a corporate backbone network for secure network management while still providing for the confidentiality and integrity of the management data. The SRMA increases both the security and the availability of remote management of devices.

The initial release of the SRMA provides secure remote access for network administrators to the console port of a device or virtual terminal access through a dedicated segment for management of a device. The SRMA allows for access selectivity at a user level and at a network address level.

The SRMA can utilize network services to provide a centralized and scalable solution for secure remote management of the network. Some of the network services accessed can include an Access Control Server (ACS) to provide for centralized strong authentication and authorization at the user level, a NTP server to provide time synchronization for the SRMA, a Domain Name Server (DNS) to provide name resolution for the SRMA, a logging server to provide for centralized logging, and a network management station to provide for centralized management of the SRMA and the devices the SRMA is protecting, utilizing a protocol such as Simple Network Management Protocol (SNMP). The SRMA can access the network services via a connection to the backbone network (or an operations support network) or via a tunnel through the out-of-band network to the backbone network.

While many of the building blocks of the SRMA are in common use today, they have never been combined in such a way as to solve the problem of securing remote management. Since there is a very strong need for securing remote management yet this has not been done, it is clearly not obvious to do this to one of ordinary skill in this area. This invention combines these building blocks along with additional new features to solve the shortcomings in remote management.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
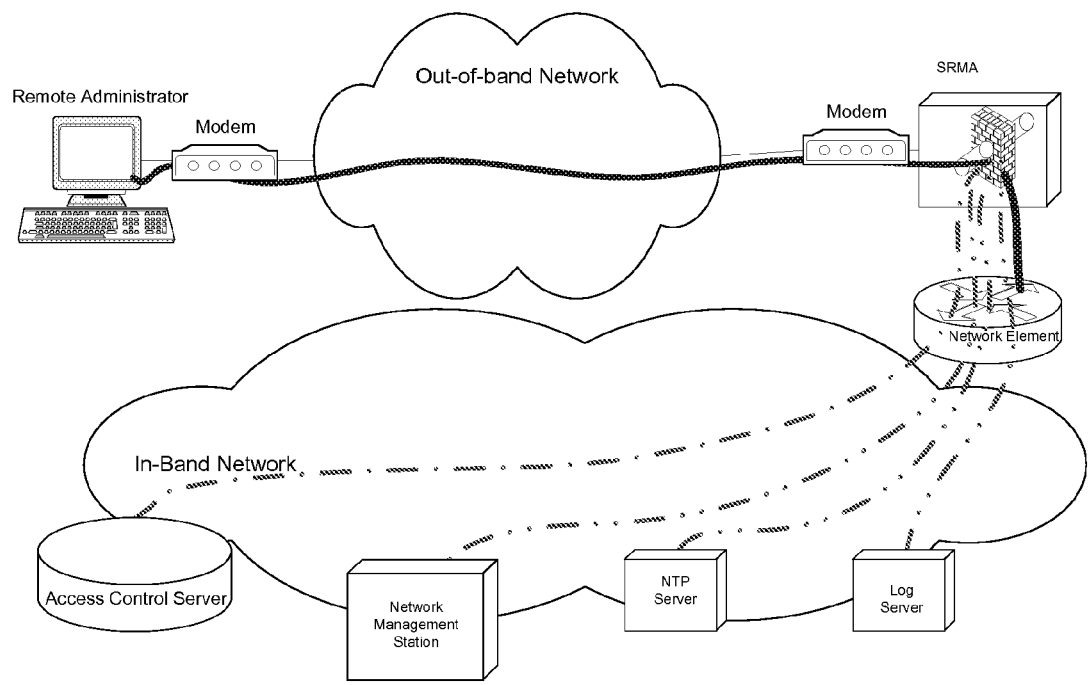
FIG. 1 illustrates Dial-in Access to SRMA

FIG. 1 illustrates the positioning of the SRMA device in a network utilizing a PSTN as the out-of-band network.

Figure 2:
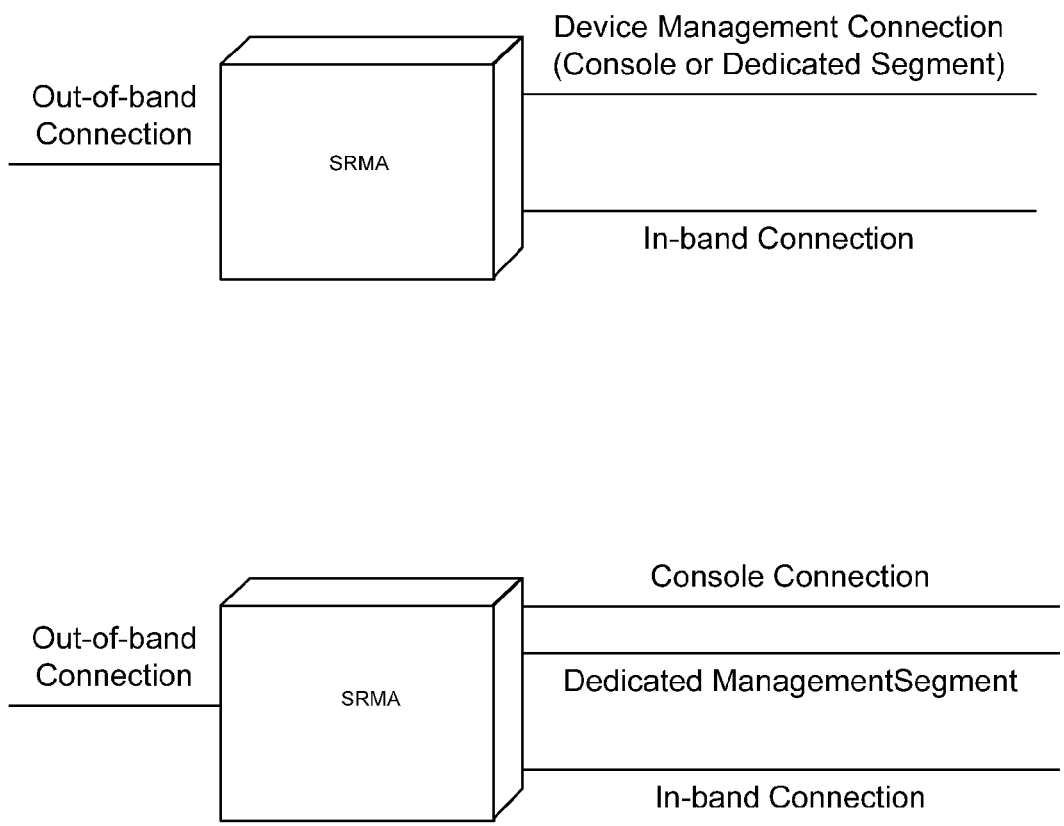
FIG. 2 illustrates SRMA Connections

As shown in FIG. 2, the SRMA has three categories of connections:

Management Connections are connections from the SRMA to the interfaces on the end device utilized for managing the device which can be a console connection and/or a connection to a dedicated management segment;

Out-of-Band Connections are connections from the remote administrator to the SRMA that are not a part of the network being managed; and In-Band Connections are connections from the SRMA to the data network being managed or the standard operations support network.

Management Connections

Management Connections can take two forms, connections to the console or management port of the device or connections to network segments that are dedicated to device management.

Access to the console port of the network element is generally via an RS-232 serial interface. The SRMA can have multiple connections for accessing device consoles.

Access to a dedicated network segment for network management can be any type of network, but in today's environment the most likely types of segments would be Ethernet or Fast Ethernet segments. Ideally, this would be a back-to-back connection to the device being managed, but it can also be an interface to a dedicated segment such as a virtual local area network (VLAN) on a switch. In this case, multiple network elements can be managed via the dedicated segment. The SRMA can also support multiple interfaces to dedicated management segments.

Out-of-Band Connections

The out-of-band connection type requirement would be determined by the modem or device used to access the secondary network. With an analog modem this would generally be a serial RS-232 connection to the modem. With broadband modems, this would generally be an Ethernet interface.

In-Band Connections

The in-band connection is an interface from the SRMA to the network being managed. Typically the SRMA will use this network to get to network services like an ACS server, a DNS server, a logging server, a network management station, or an NTP server. An in-band connection from the SRMA to the in-band network provides a path to the network services that should be "always up". This interface can be of any supported interface type that can access the primary network. Most often this would be either a serial interface or an Ethernet interface (including possibly Fast Ethernet or even Gigabit Ethernet). Often this connection will be to an additional interface on the network element being managed.

There are a number of ways the SRMA can be utilized in a network for remote management of the network elements. Some of the sample configurations include:

Secure Console Access via remote administrator dial over PSTN;

Secure Console Access via Gateway or Network Access Server (NAS) to Out-of-Band Network;

Network Services provided via Out-of-Band Network; and

Secure Console Access via Remote Administrator Dial Over PSTN.

Figure 3:
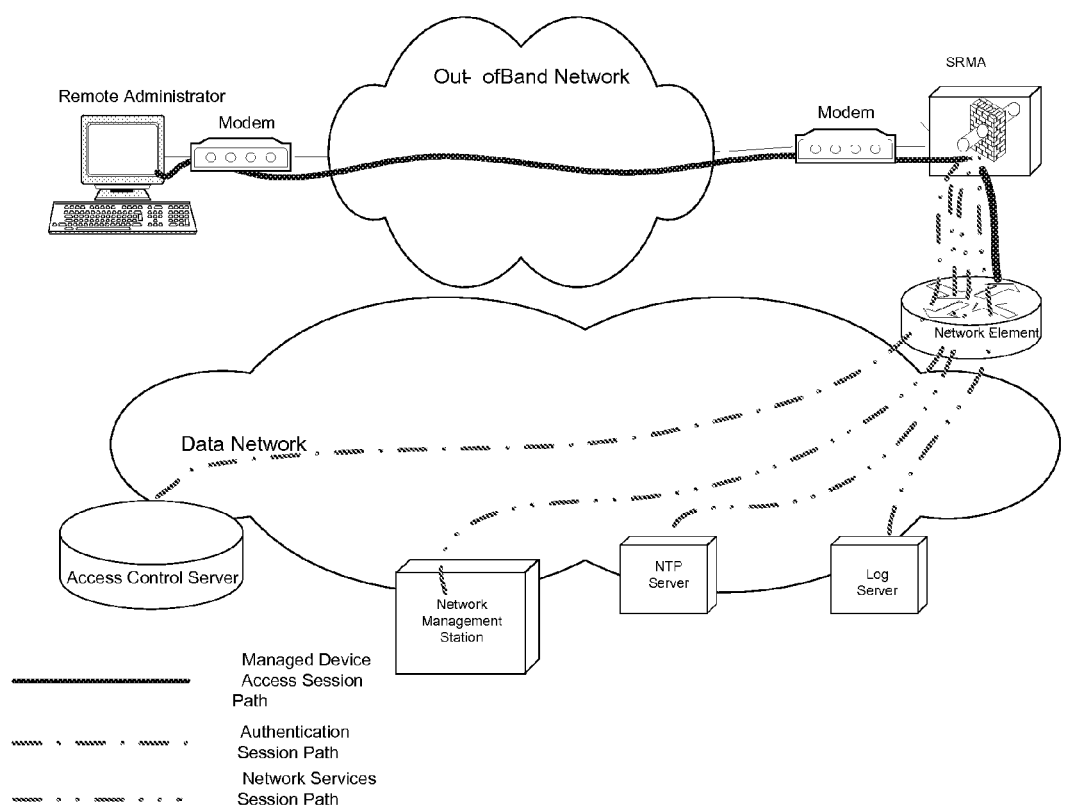
FIG. 3 illustrates a PSTN Out-of-Band Network

In this scenario shown in FIG. 3, the remote administrator is using their workstation to directly dial the PSTN phone number for the SRMA in order to access a console connection to a network element services by the SRMA. The SRMA would set up a point-to-point Internet Protocol (IP) connection to the remote administrator and the remote administrator would run a secure client such as secure shell or an HTTPS client on their workstation for communicating with the SRMA. This would secure the communications between the remote administrator and the SRMA. The SRMA would then proxy their terminal requests to the console connection or the telnet connection on the dedicated management segment.

The SRMA can and should be configured to perform authentication and authorization of the remote administrator before allowing access to the management connection for the network element. While the SRMA could be configured with a database of authorized administrators, it is also possible to utilize an ACS to authenticate and authorize a remote administrator. The SRMA utilizes its in-band connection to access network services such as an ACS in the network using a protocol such as Remote Authentication Dial-In User Service (RADIUS) protocol or Terminal Access Controller Access Control System (TACACS+). This would allow centralized authentication and authorization of the administrators. In this type of configuration, if connectivity to the network is down, the SRMA would have to revert to allowing access based on a locally maintained database.

Secure Console Access via Gateway or NAS to Out-of-Band Network

Figure 4:
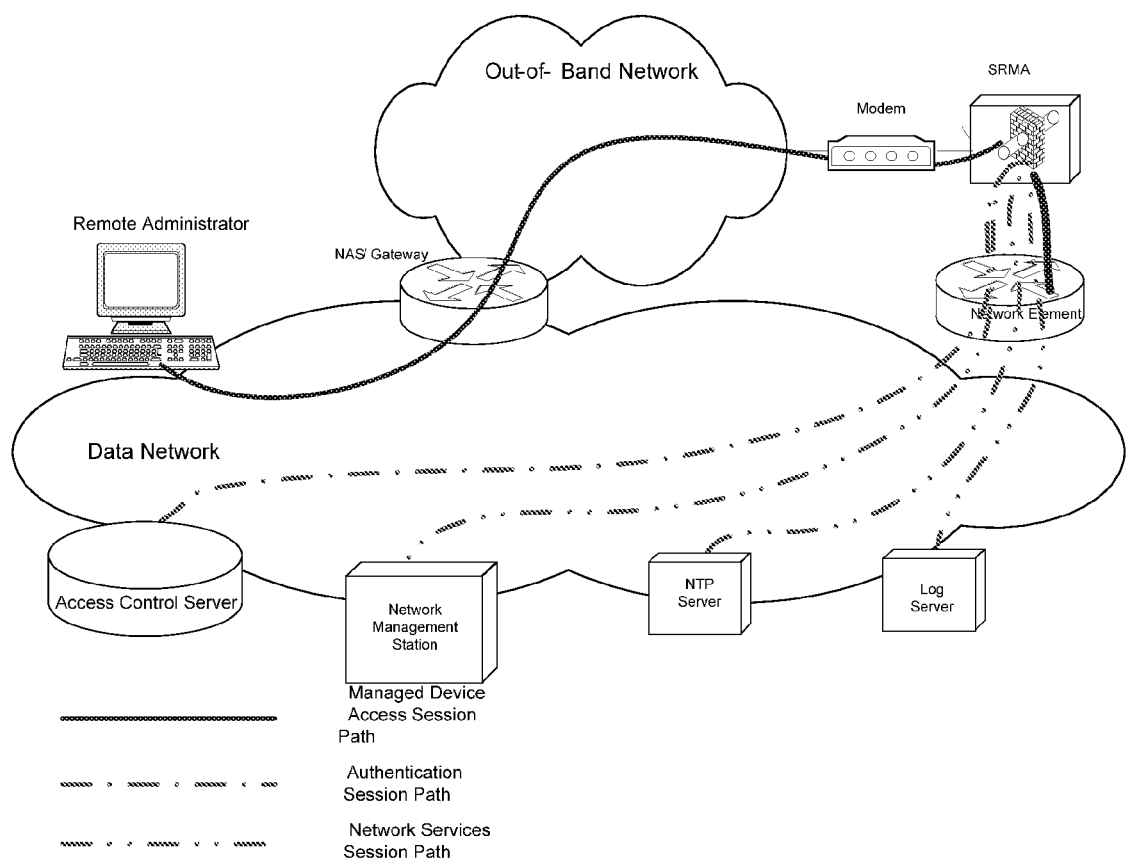
FIG. 4 illustrates Network Gateway to Out-of-Band Network

FIG. 4 shows another configuration that can be used to allow remote administrators access to the SRMA (and then to the management connection of the network element) is to utilize a NAS to dial out to the SRMA. The administrator accesses a port on the NAS utilizing a protocol such as secure shell causing the NAS to dial the SRMA over the PSTN. The SRMA then uses this connection. It would also be possible to set up a NAS such that HTTPS traffic to the specified port would cause the NAS to dial the SRMA.

Figure 5:
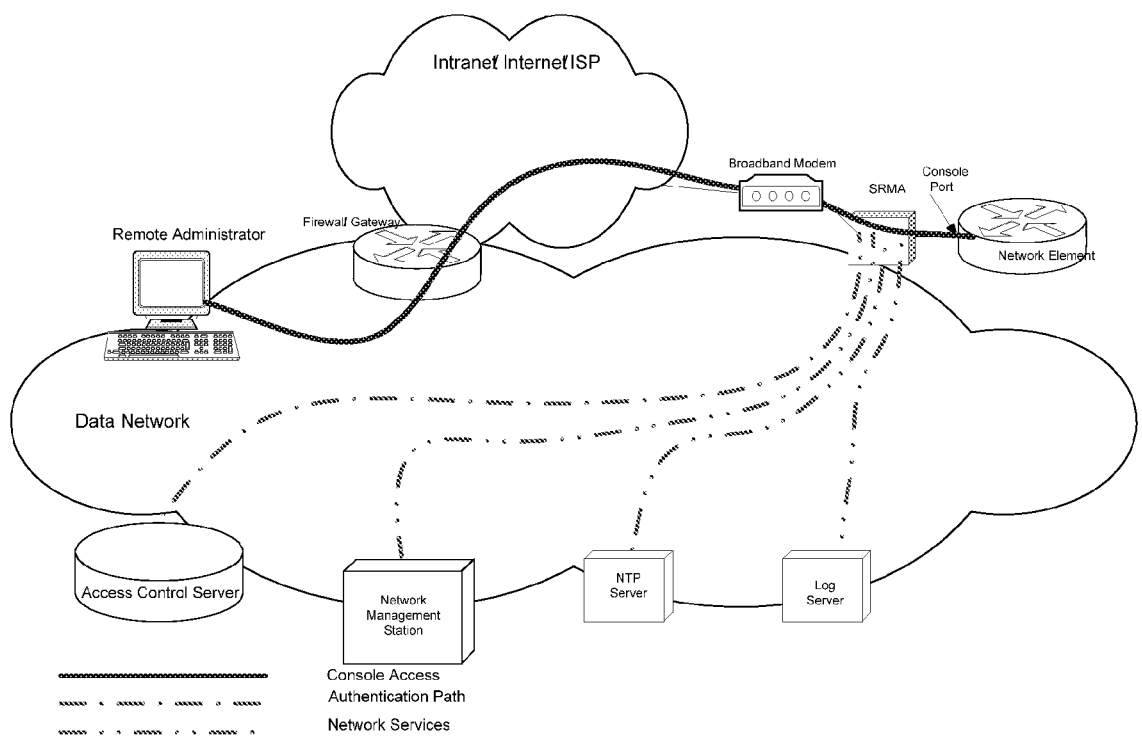
FIG. 5 illustrates ISP Access to SRMA

The out-of-band network does not have to be a PSTN network. For instance, in FIG. 5, if the SRMA is utilizing a Digital Subscriber Line (DSL) connection to an Internet service provider (ISP) and the Data Network has a gateway to the internet this diagram would work as well (though you would really want some sort of virtual private network (VPN) concentrator connected to the Internet allowing access only to configured SRMA clients).

Network Services Provided Via Out-of-Band Network

One difficulty with using a centralized ACS is that, on occasion, a network administrator is attempting to access a network element during problem determination when the network connectivity is down. If every time an administrator needed to access the management interface to a network element when the network access was down they needed to know a locally configured password on the SRMA, it would be very easy for too many people to get to know that password for it to be secure.

Another alternative is for the SRMA to utilize the out-of-band network connection for connectivity to the ACS for authentication and authorization as well as other network services. If the SRMA is utilizing a broadband connection such as DSL to access an ISP and then is utilizing a VPN client to connect to a VPN gateway on the in-band data network, not only can this VPN tunnel be used for remote administrator access to the SRMA, but the VPN tunnel can also be used by the SRMA to access network services in the data network. The SRMA can be configured to always utilize the out-of-band connection for network services, or only to utilize it when the in-band connection to the network service is down. The connection between the Data Network and the Internet would be able to utilize VPN services that exist today for VPN gateways.

Figure 6:
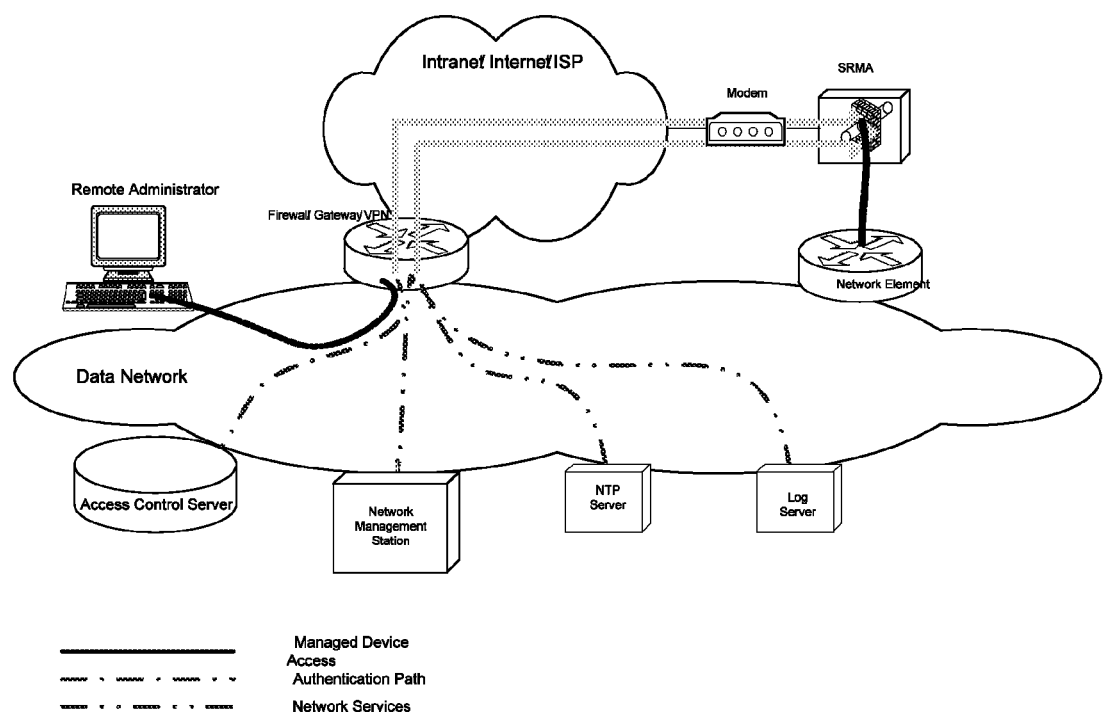
FIG. 6 illustrates Utilizing VPN Tunnel for SRMA Access to Network Services

In the configurations where a VPN tunnel is being built across the out-of-band network as shown in FIG. 6, the network administrator may decide to allow the remote administers to use the telnet protocol to access the SRMA if they trust the security of the primary Data Network. The telnet traffic would travel in the clear between the remote administer and the gateway. The gateway would encapsulate the traffic in an Internet Protocol Security (IPSec) tunnel providing for data confidentiality and integrity as it travels across the "untrusted" out-of-band network. The SRMA would then receive the traffic from the IPSec tunnel and would proxy the connection to the console connection or the management segment.

Figure 7:
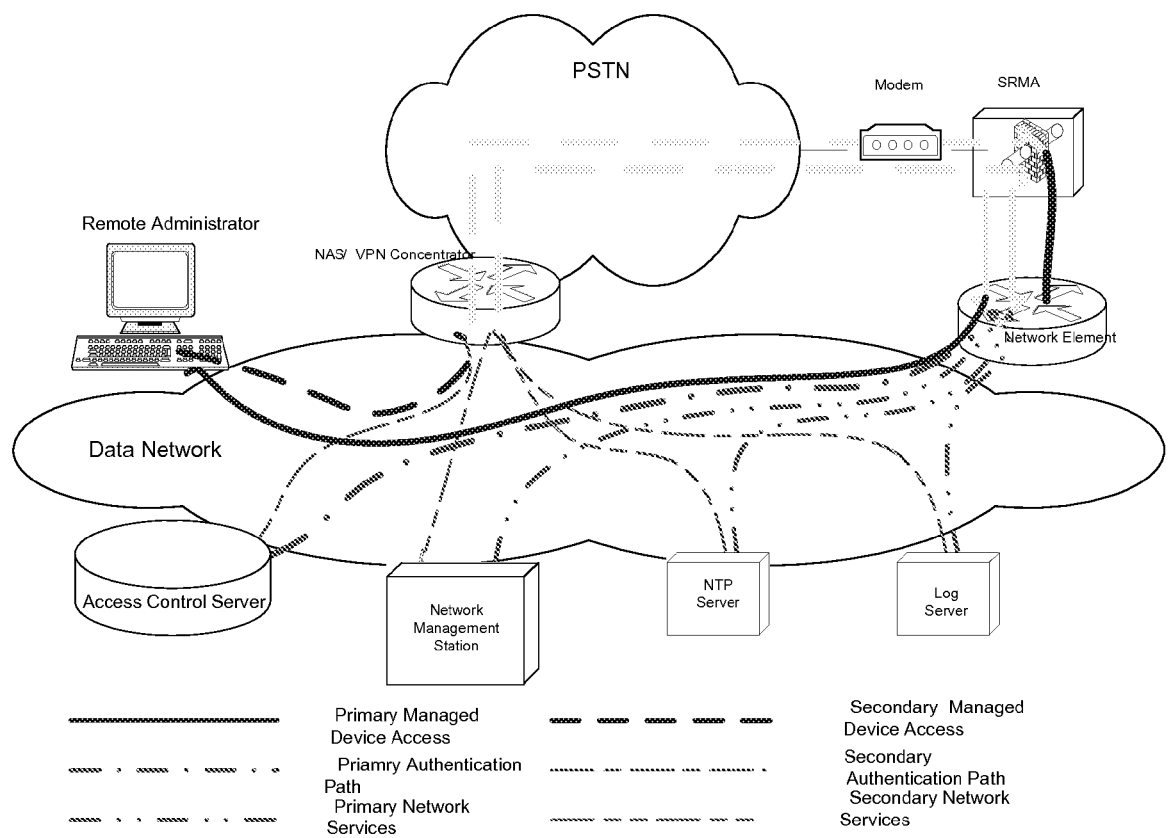
FIG. 7 illustrates In-Band and Out-of-Band Access to NS

Even if the out-of-band network is a PSTN dial network, this connection can be utilized for the SRMA to access network services (see FIG. 7). This is more likely to be a case where the SRMA will generally utilize a connection to the primary data network for access to network services, but if that connection is down the SRMA will utilize the out-of-band connection for access to the network services.

Figure 8:
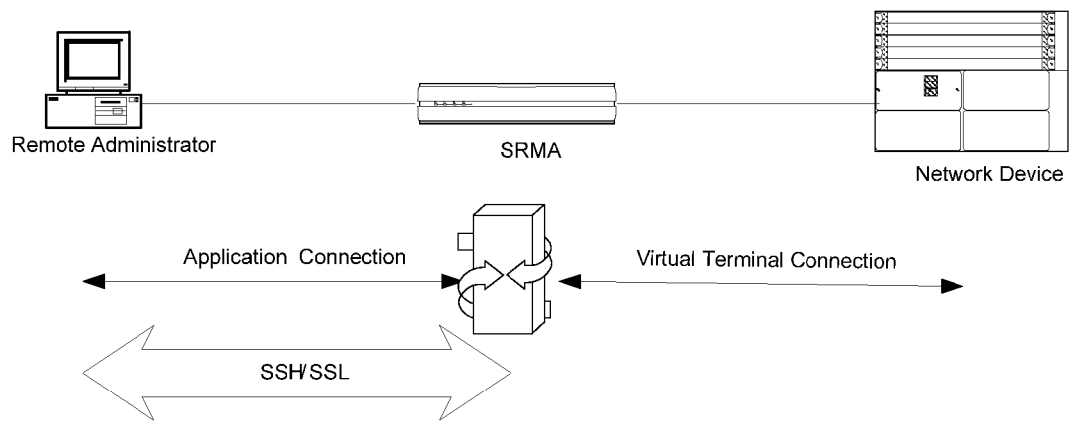
FIG. 8 illustrates the SRMA functioning as a proxy firewall

One feature of the SRMA, as shown in FIG. 8, is to function as a proxy firewall for a device management command line interface (CLI). The remote administrator would connect to the SRMA CLI proxy for the managed device (preferably using a secure protocol such as Secure Shell (SSH) or IPSec). The CLI proxy would then connect to the managed device using different protocols (such as a virtual terminal protocol or Telnet).

Figure 9:
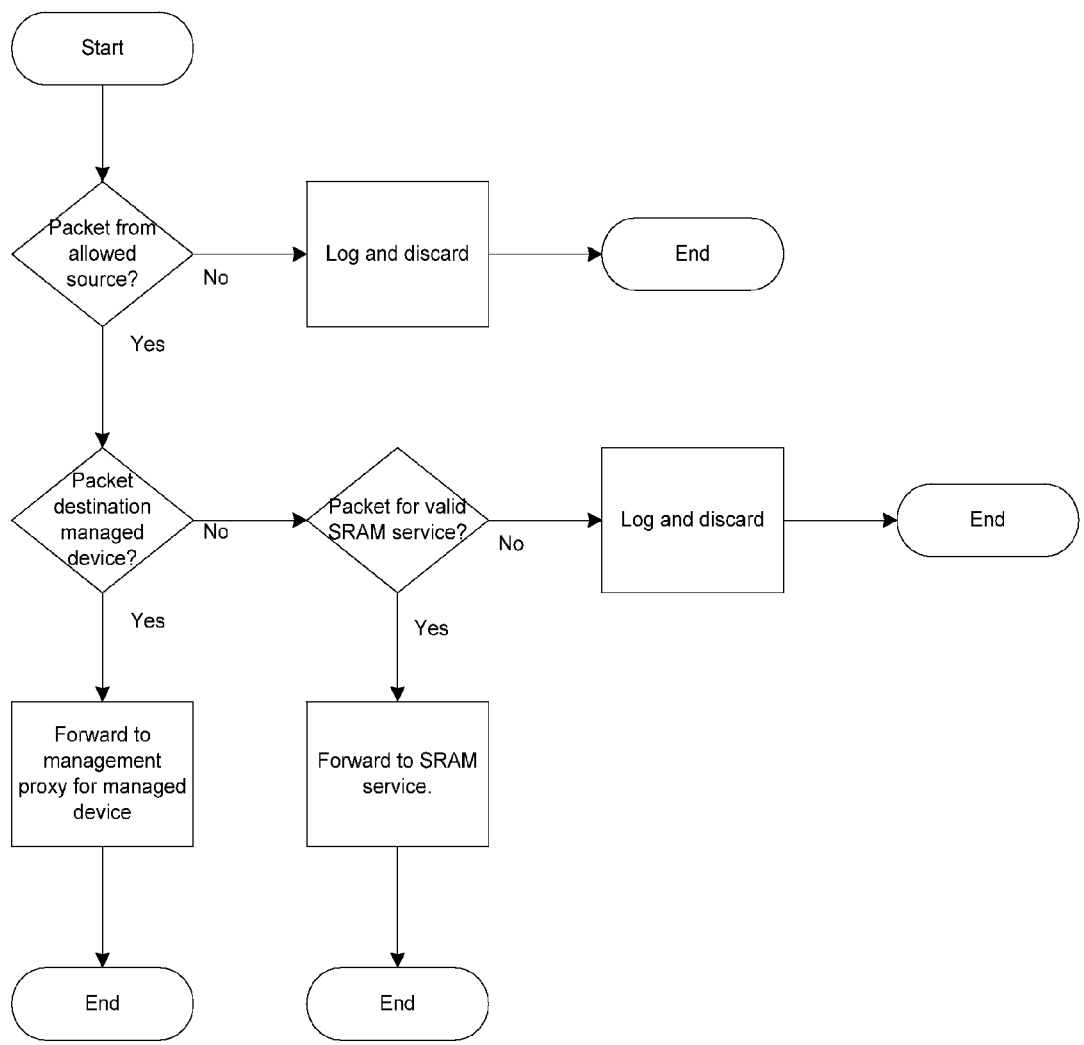
FIG. 9 is a block diagram of an SRMA filtering process

The SRMA can be configured to filter packets on various criteria such as origin IP address or telephone number. For example, as shown in FIG. 9, if a packet is not from a valid source, log information will be recorded and the packet will be discarded. If the destination of the packet is for a managed device, the packet will be forwarded to the CLI proxy. If the destination is not for a managed device, the packet will be checked to see if the destination is for a valid operating service on the SRMA. If so, it will be forwarded to that service. If not, it will be logged and discarded.

Figure 10:
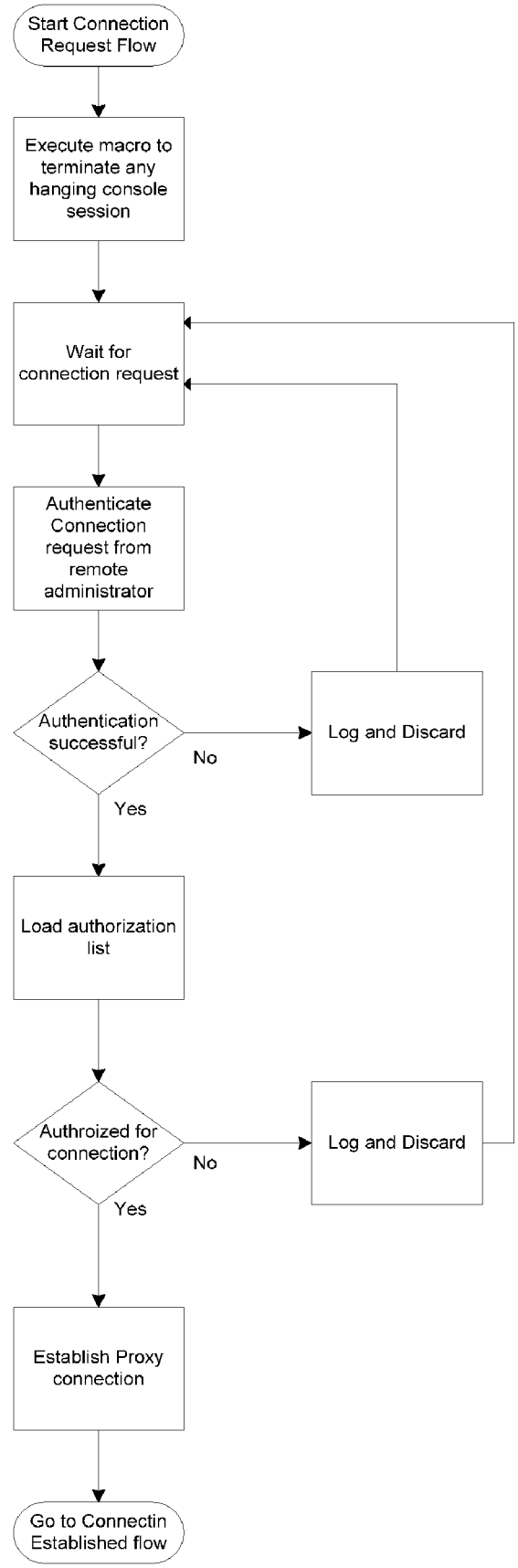
FIG. 10 is a block diagram of a new connection authentication process

When a request for a new connection to a managed device is received, the CLI proxy would use services from the SRMA to authenticate who the user is and obtain the list of commands they are authorized to execute, as shown in FIG. 10. The SRMA could be utilizing the services of a centralized Authentication Services to provide these services to the CLI proxy. The CLI proxy can be configured to only allow connections for authenticated users that are authorized to connect to the service. Unauthorized connection requests will be discarded.

Figure 11:
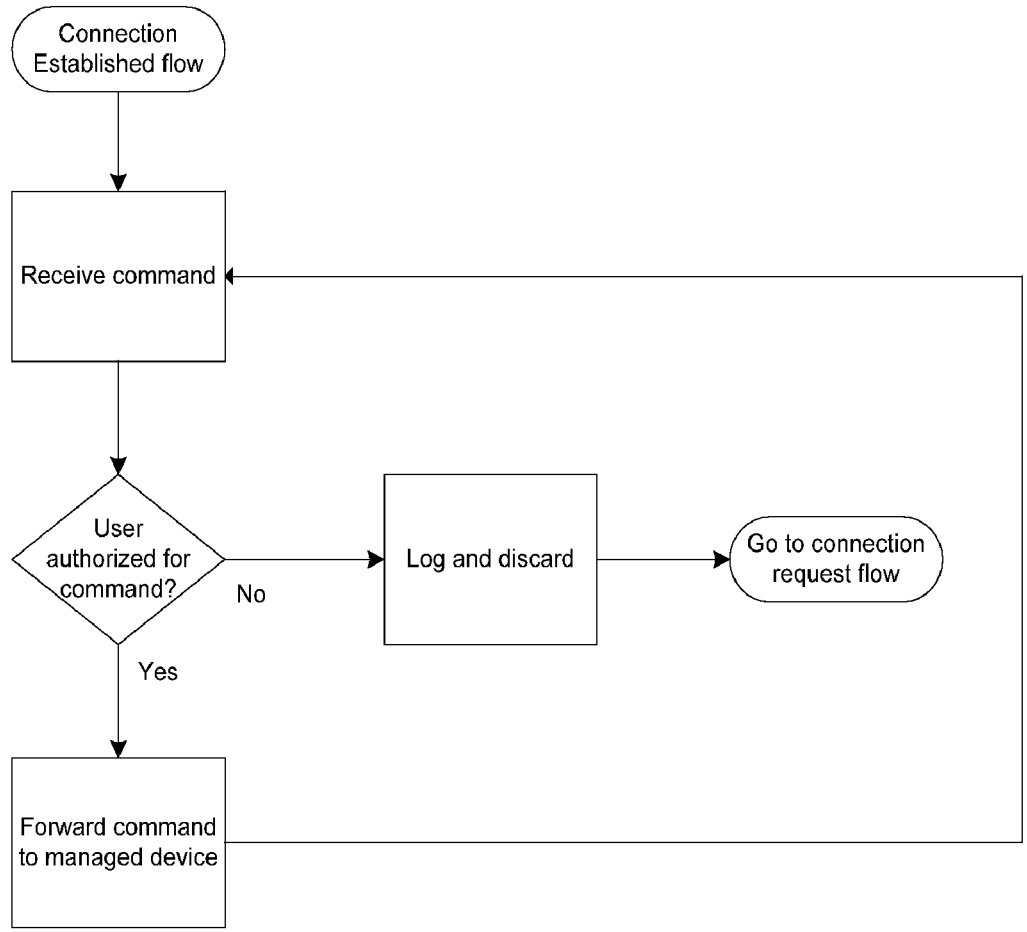
FIG. 11 is a block diagram of a command verification process

FIG. 11 shows one example of a process for authenticating a command. When a command from the remote administrator arrives at the proxy, the CLI proxy can compare the command to the list of commands allowed for the remote administrator. The list could be of commands they are allowed to perform, or of commands they are not allowed to perform. If the user is not authorized to perform the command, the attempt will be logged and the command discarded. If the user is authorized to perform the command, the command will be forwarded to the managed device.

Figure 12:
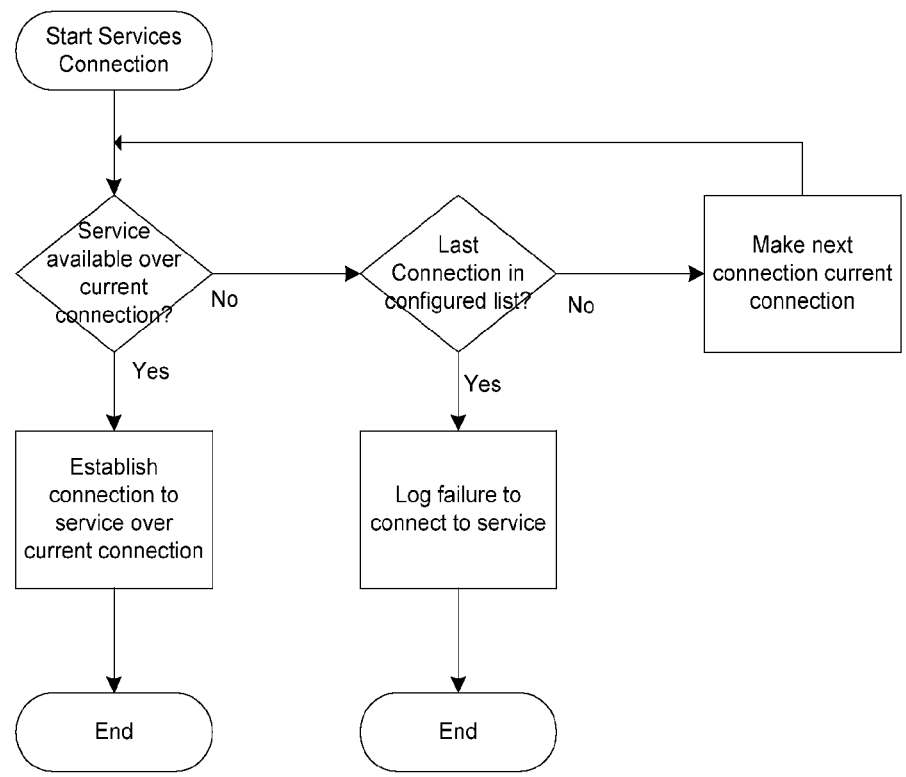
FIG. 12 is a block diagram showing a network server connection process

The SRMA can make extensive use of network service in order to facilitate the remote management of network devices. These services and include a centralized authentication server, a network time server (utilizing a protocol such as NTP), remote logging servers, and network management stations for reporting. The SRMA is set up to be able to access these network servers over multiple interfaces. Some of these interfaces will be in-band connections and some can be out-of-band connections. There are circumstances where it would be useful to utilize an in-band connection when available and only use the out-of-band connection when the in-band connection is not available. The SRMA can be configured to attempt to connect to network services according to a priority list starting at the top of the list, see FIG. 12.

Figure 13:
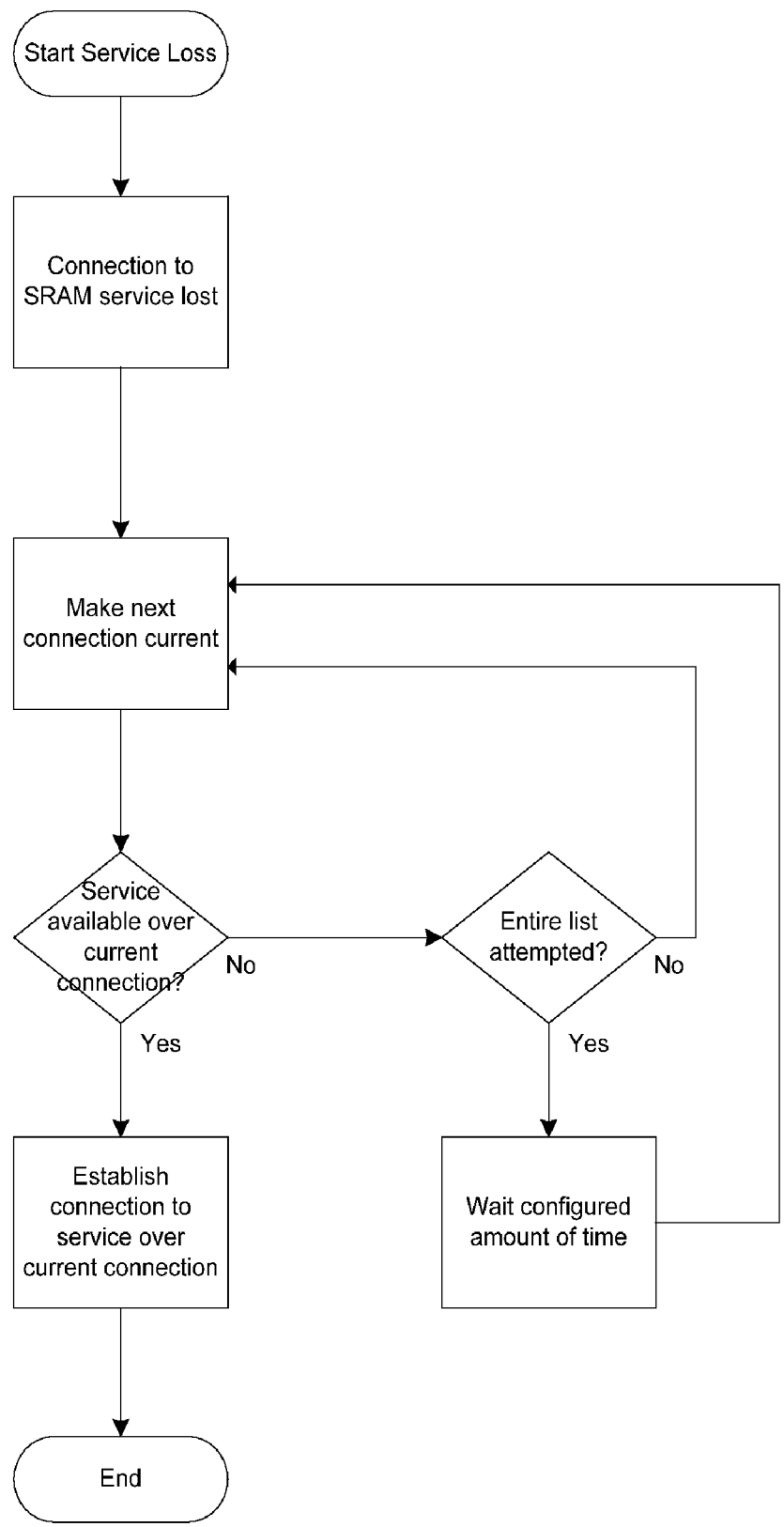
FIG. 13 is a block diagram showing a network server reconnection process
Figure 14:
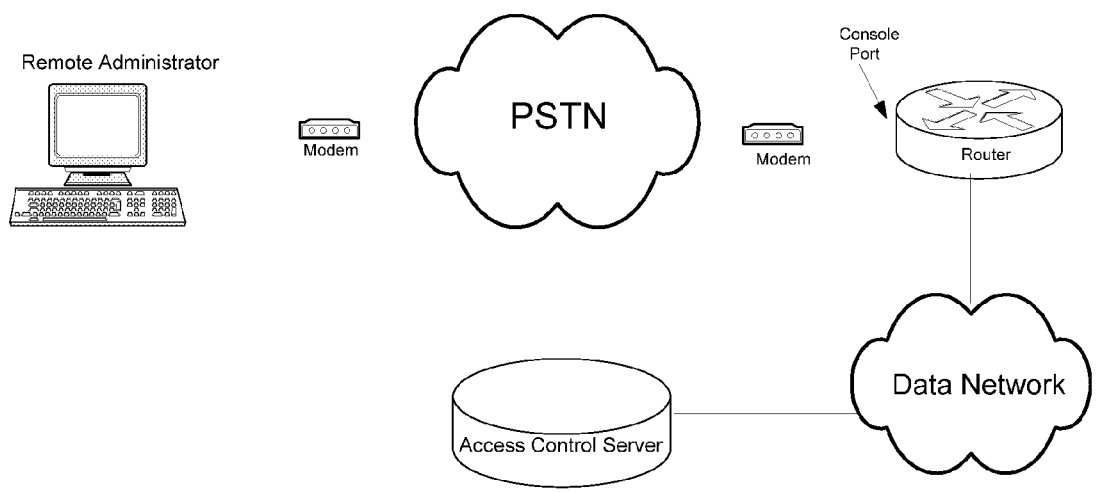
FIG. 14 illustrates a typical setup of a modem connection to a network device such as a router.

In the event that an existing connection of a network service is lost, the SRMA can attempt to reestablish a connection to the network service over another interface, as shown in FIG. 13.

Figure 17:
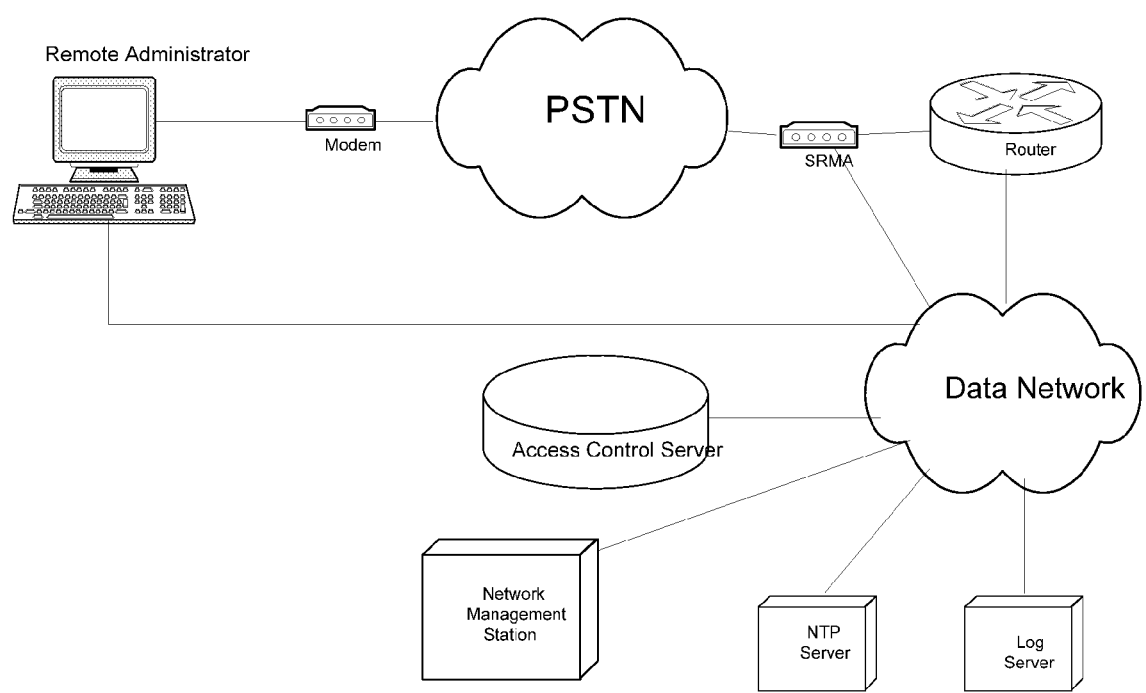
FIG. 17 illustrates an SRMA connection both to a router console port, a PSTN, and a data network.
Figure 18:
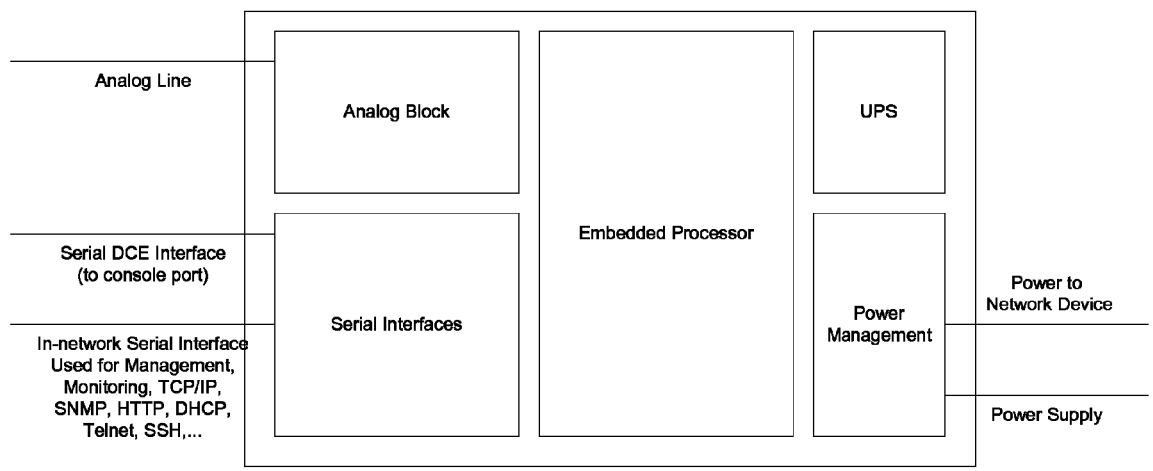
FIG. 18 illustrates a logical component breakdown of a preferred exemplary embodiment of the present invention.
Figure 19:
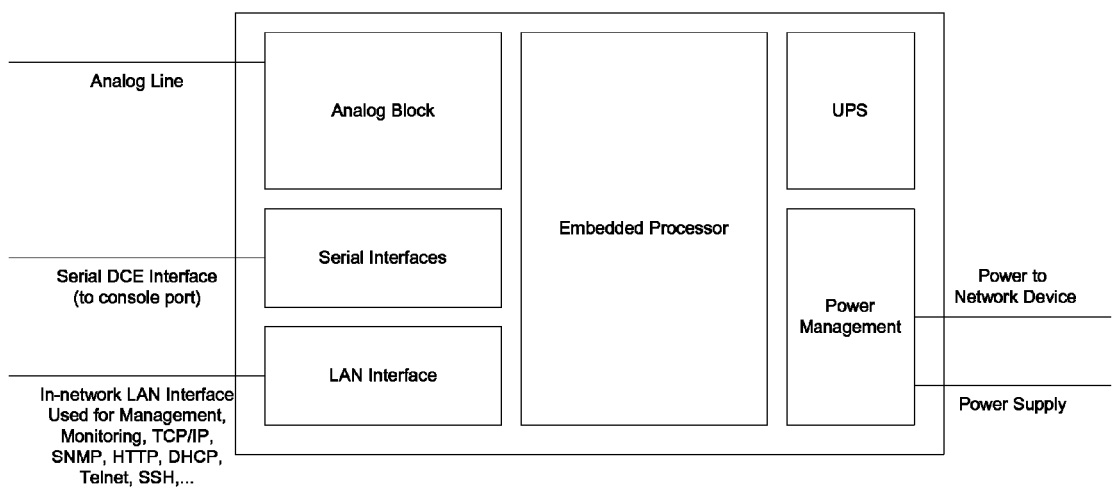
FIG. 19 illustrates a logical component breakdown of an additional preferred exemplary embodiment of the present invention.
Figure 20:
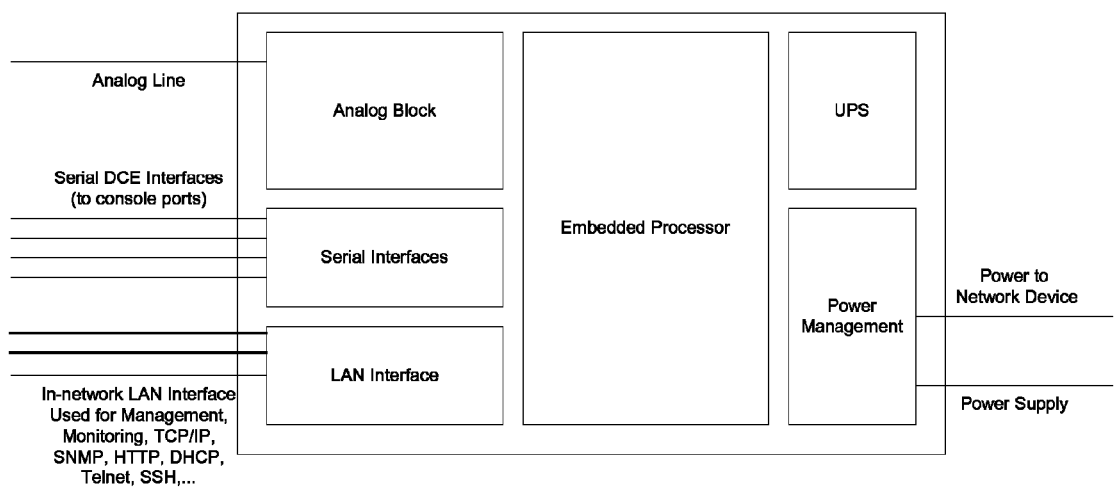
FIG. 20 illustrates a logical component breakdown of an additional preferred exemplary embodiment of the present invention.
Figure 21:
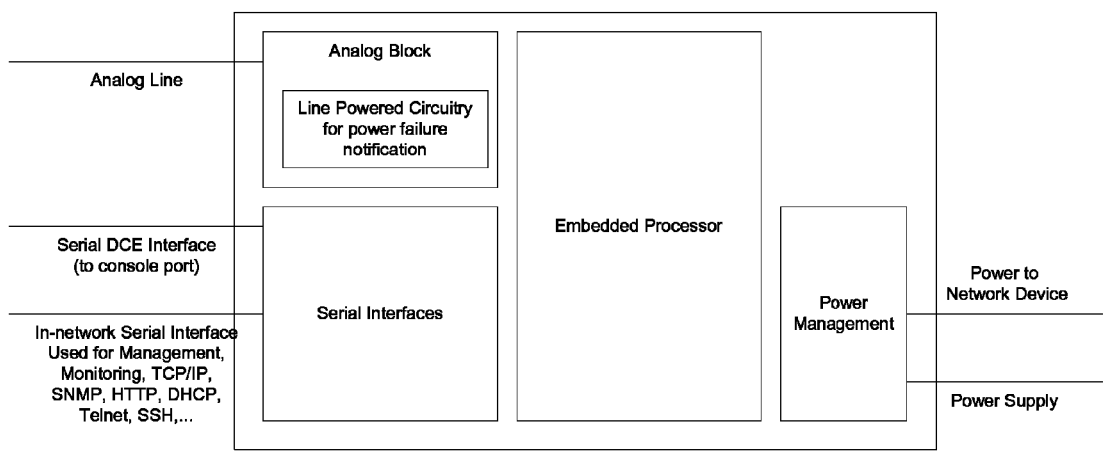
FIG. 21 illustrates a logical component breakdown of an additional preferred exemplary embodiment of the present invention.

The SRMA may include an integrated modem consisting of an interface to a telephone line and a Data Circuit-terminating Equipment (DCE) interface for a connection to Data Terminal Equipment (DTE). In addition, the SRMA may include one or more additional network interfaces as illustrated by FIGS. 17-21. One or more of the additional network interfaces could be used for reporting status information to a network management station and for allowing for remote configuration of the SRMA. This network connection could also support a network protocol (such as Transmission Control Protocol/Internet Protocol (TCP/IP)) and application protocols (such as SNMP, Telnet, HTTP, or Secure Shell) to facilitate this remote reporting and configuration as well as allowing network users access to the SRMA. The connection to the primary in-band network could be a serial interface as depicted by FIG. 18 and FIG. 21, a local area network (LAN) connection as depicted by FIG. 19 and FIG. 20 or any other type of network connection. As depicted in FIG. 20, the SRMA can support multiple connections to the primary data network. Additional SRMA connections could also be included for connections to additional DTEs as depicted in FIG. 20.

The existence of a network connection to the primary data network also allows the SRMA to implement client protocols for centralized Authentication, Authorization, Accounting, and Auditing (AAAA) the same as many other networked devices do. An example of such a protocol would be RADIUS. This would allow the SRMA to do strong authentication and authorization by connecting to a centralized server like Cisco's Access Control Server and eliminate a security hole. FIG. 17 illustrates an ACS in the network for the SRMA to access.

In the event that the SRMA does not have a management connection or is unable to connect to the centralized server, as would be the case if the SRMA's connection to the primary data network were down, the SRMA can utilize the out-of-band connection for accessing the network services in many cases. In the case when the SRMA cannot access network services over the out-of-band connection as well, but the user has network connectivity to an appropriate access control server and new authentication protocol called Isolated Challenge Mode (ICM) can be utilized.

Another example of the usefulness of the isolated challenge mode of operation can be shown using Cisco routers. Today, Cisco routers allow you to specify a sequence of authentication and authorization methods and these methods are tried in order until a method is able to accept or reject an authentication or authorization. For instance, a router may have specified to first try TACACS+ and then try local authentication (user name and password configured on the router). If the router has lost connectivity with the TACACS+ server for whatever reason then centralized authentication and authorization (and auditing) is gone. The same would be true of authorizing the ENABLE privileged mode on the router. If the connection to the TACACS+ server is down then the router might be configured to accept an enable password configured on the router. Often these passwords that are configured locally on the routers are configured the same on every router in order to administrate the process and these passwords can become well known. The isolated challenge mode could be the second choice of authentication if the connection to the TACACS+ server is down. This would allow continued use of centralized authentication of the connecting user even when the router is isolated (using the same database the TACACS+ server is using).

The user can connect to the SRMA in several roles. They can connect to the SRMA as a user desiring to connect to a serial port and will be authenticated for the specific port they are trying to connect to, they can connect as a network performance management operator gathering performance statistics for the SRMA, they can connect as a network management administrator, or they can connect as a network management security administrator for the SRMA. The Protection Profile for Switches and Routers, incorporated herein by reference, available from the Information Assurance Technical Framework (IATF) provides more information about these rolls.

While the SRMA would be performing the isolated challenge authentication and authorization in a terminal mode as described above, other situations could make use of a frame or packet based isolated challenge mode. Both terminal mode and packet mode isolated challenge authentication will be discussed in more depth.

The secure mode of operation of the SRMA allows information that would otherwise be transmitted in clear text between the user and the router to be encrypted by the SRMA and be protected between the SRMA and the user. The information would only be in clear text between the router console port and the SRMA and both these devices should be physically secured together. Since some of this information could be router configurations and passwords, protecting this information is vital.

There are multiple methods for the SRMA to report status information to monitoring stations or for the SRMA to allow for remote configuration of the SRMA. The existence of a network connection from the SRMA to a data network allows the SRMA to regularly report on the status of the SRMA and its connections. This status information can be reported via standardized means such as SNMP, or via private protocols, or a combination of both. Some status information can also be reported using the PSTN connection. This is especially important if status information is to be communicated when the SRMA connection(s) to the data network(s) is (are) down. An example of this could be if the serial connection to the console port of the router looses the Data Terminal Ready signal indicating the console port has either been unplugged or gone down. The SRMA can be configured to dial a determined number and report this outage over the PSTN.

It is also possible to configure the SRMA to monitor the console port for information that is logged to the console, filter the console messages, and dial out and send an alert over the PSTN for certain error conditions such as a particular interface going down. If the interface that went down were the interface the router would normally have sent the alert over then this might be the only way the alert gets sent.

The SRMA can also be configured to execute a macro before a call is connected to a serial port or when a call is disconnected from a serial port. In the case of the serial port being connected to a Cisco console a major advantage of this would be or automatically have the SRMA log out a user from the console as soon as a call becomes disconnected and not allow any new called to connect to that port until the previous user has been disconnected. This can be used to force each user to log in with their own userid without any risk of them inheriting the previous user's privileges without logging in.

Figure 32:
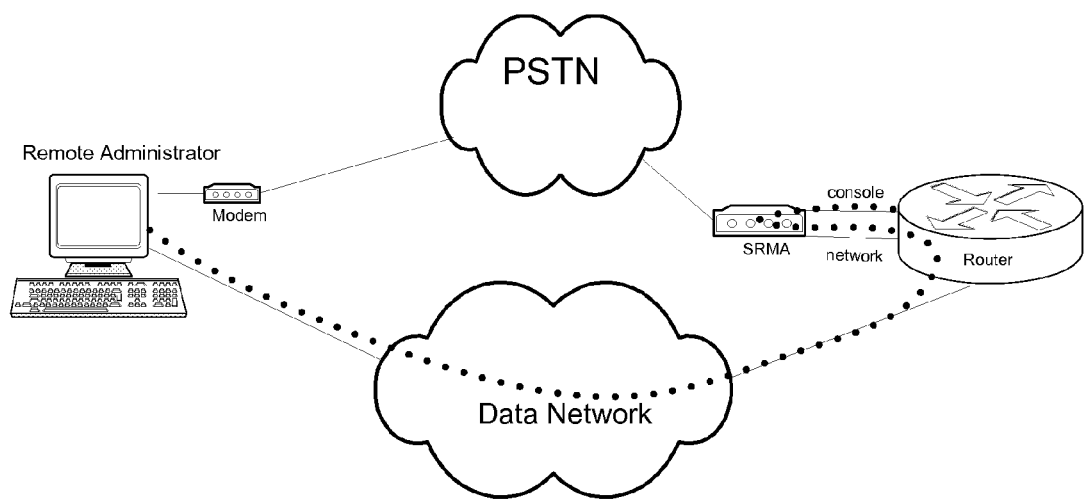
FIG. 32 illustrates a remote administrator connecting to a router console port over the in-band network.
Figure 33:
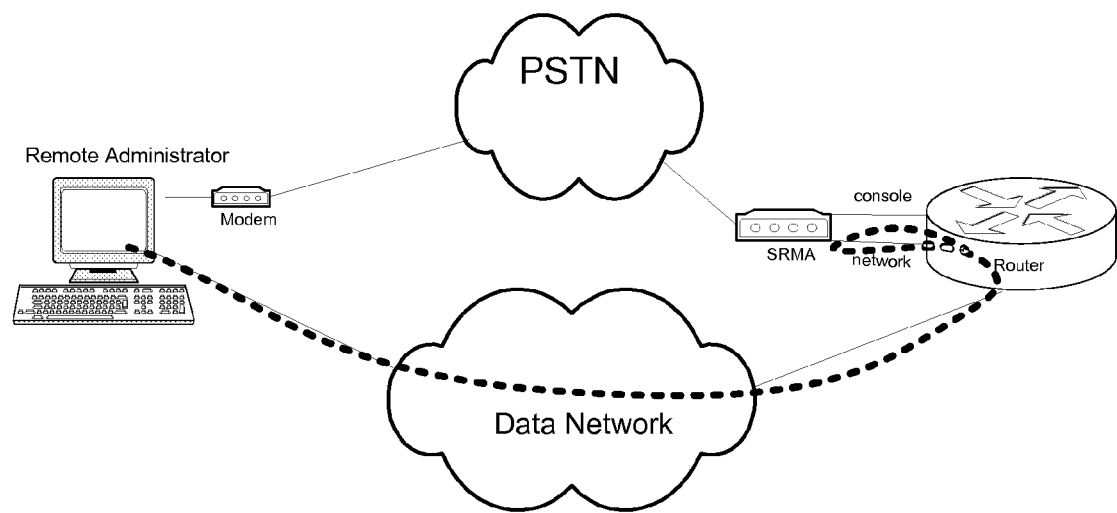
FIG. 33 illustrates a remote administrator connecting to a virtual terminal port on a router through the SRMA.

The connections from the SRMA to the data network(s) allow users to connect to the SRMA and gain access to the DTE connections from the SRMA using the primary data network as shown in FIG. 32 in addition to the connection to the SRMA via the PSTN network. This can reduce long distance charges and provide for a faster connection when the primary data network connection(s) are up. In addition, the user has the option of connecting to the SRMA in secure mode over the network, protecting the information from the user to the SRMA and then connecting from the SRMA to the console port of the router over the serial interface. As shown in FIG. 33 the SRMA could also be configured to allow the user to connect to the SRMA in secure mode and then connect to the router over a network connection using Telnet. This would still protect the information from the user to the SRMA and only expose the information as clear text from the SRMA to the router. If the connection from the SRMA to the router were a physically secure back-to-back Ethernet connection, the exposure of the information would virtually be eliminated. This would be useful where it is impractical to implement an IPSec connection to the router for management or where the router software does not yet support IPSec or Secure shell.

Figure 34:
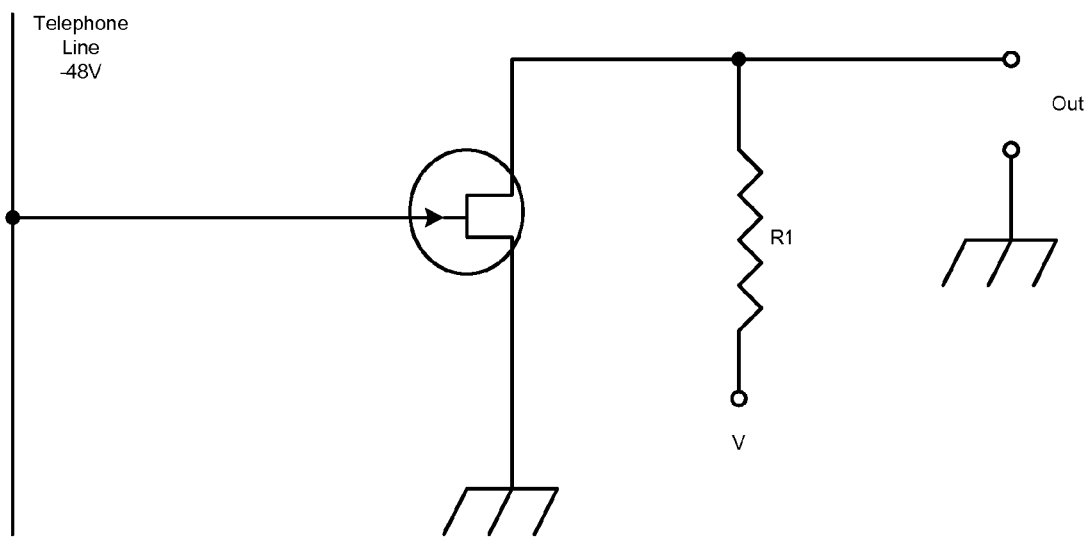
FIG. 34 illustrates a sample circuit for monitoring the voltage on a telephone line.
Figure 35:
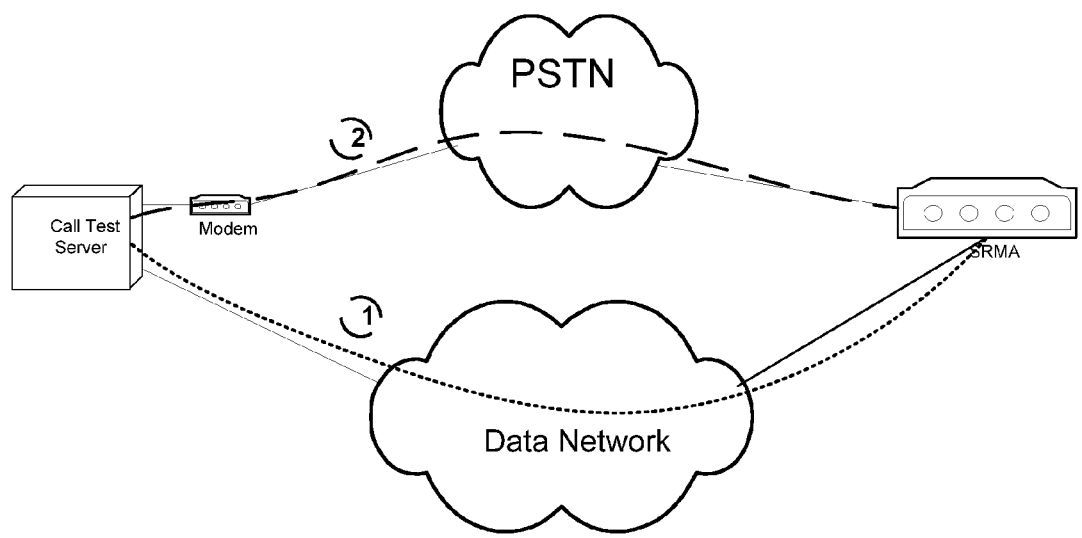
FIG. 35 illustrates the path of the call test setup (1) and the call test (2) for call testing.
Figure 36:
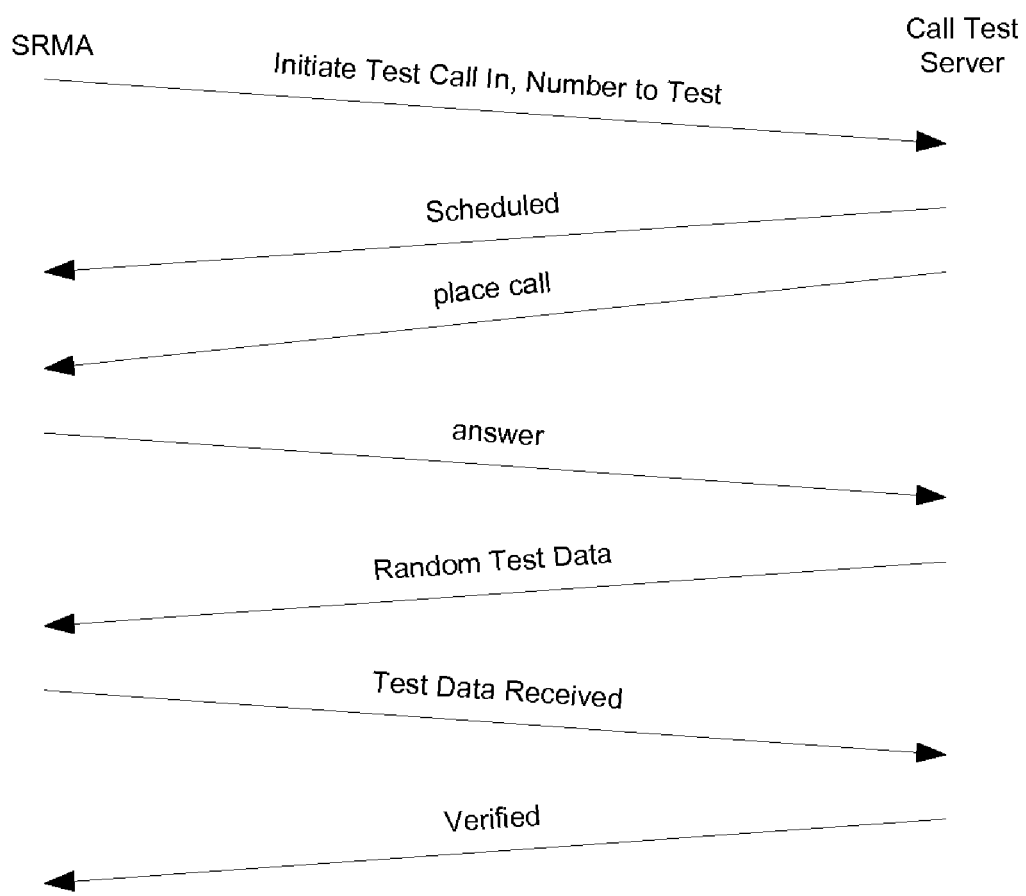
FIG. 36 illustrates the SRMA initiating a test of receiving a call.
Figure 37:
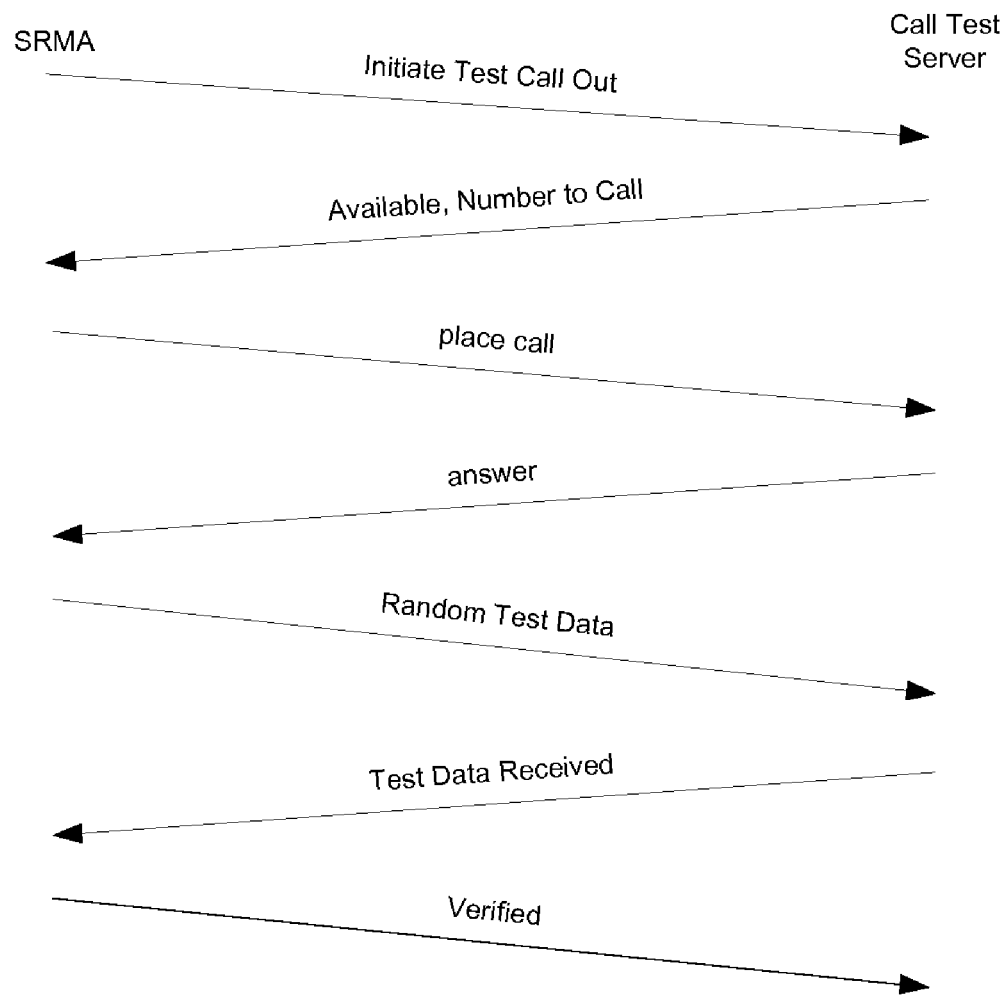
FIG. 37 illustrates the SRMA initiating a test of placing a call.
Figure 38:
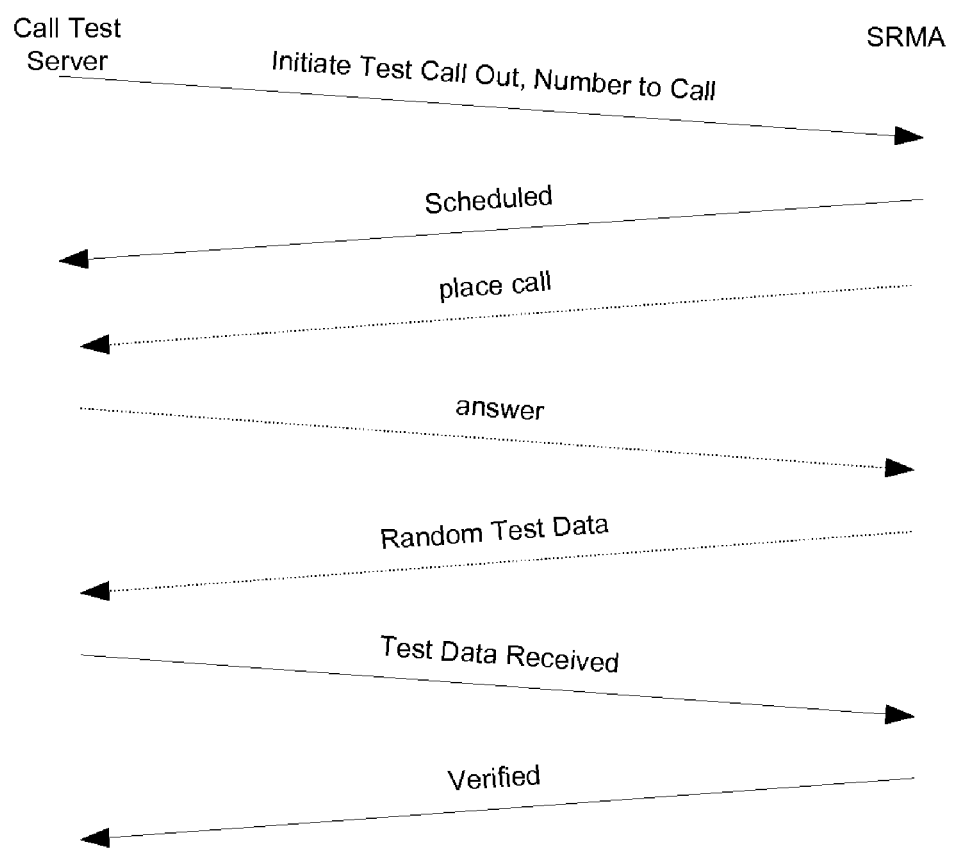
FIG. 38 illustrates the Call Test Server initiating a test of the SRMA placing a call.
Figure 39:
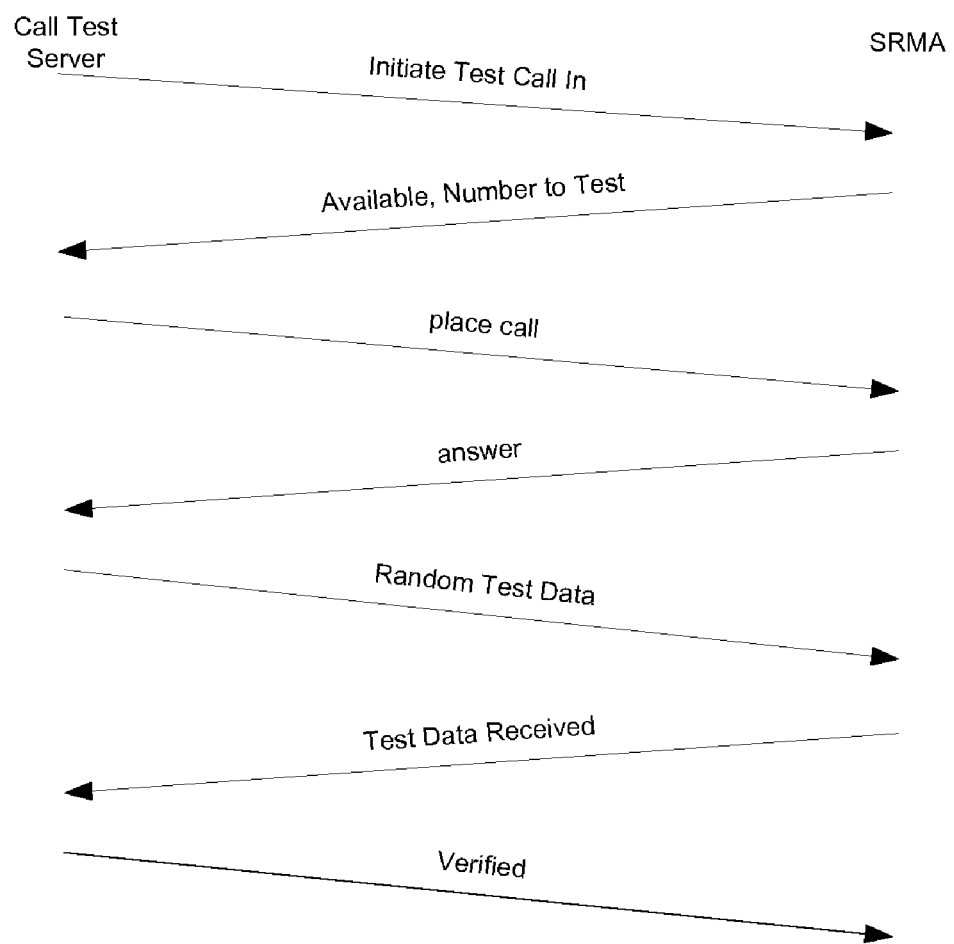
FIG. 39 illustrates the Call Test Server initiating a test of the SRMA receiving a call.
Figure 41:
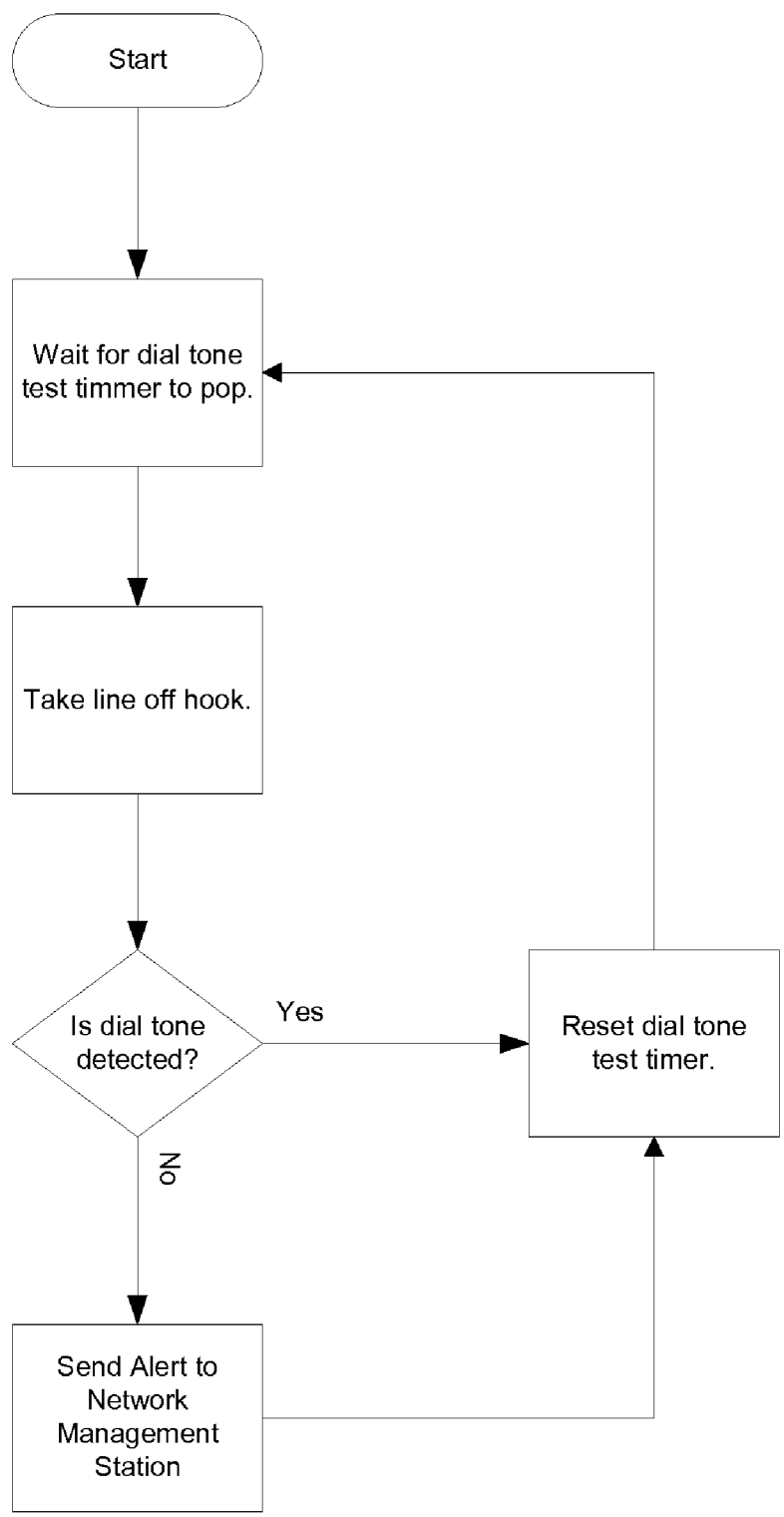
FIG. 41 shows a flowchart of the dial tone testing of a telephone line.

The SRMA includes a means of automatically monitoring the status of the connection to the telephone network. This monitoring can be accomplished by measuring the voltage levels of the telephone line with a circuit similar to FIG. 34 and/or by periodically taking the line offshoot and checking for dial tone as shown in the flow chart in FIG. 41. If the SRMA detects the connection to the telephone network is malfunctioning it will notify a monitoring station using the management connection over the primary data network.

The SRMA can also use the network connection to communicate with a Test Server to coordinate periodic end-to-end tests of the PSTN connections. The Test Server can be configured to dial into the SRMA to verify SRMA in-bound call operation and the Test Server can request the SRMA to call the Test Server to verify SRMA out-bound call operation. FIGS. 36-39 depict this test coordination.

The SRMA can also monitor an external power source. If the SRMA detects a power loss from its external power source, it will dial a configured number on the PSTN network and notify a monitoring system of the power loss. This could requires a UPS for powering the SRMA while it is notifying the monitoring platform of the power failure as depicted in FIGS. 18-20, or the SRMA could use telephone line powered circuitry for reporting the power failure as depicted in FIG. 21. The SRMA can also be configured to provide power-up notification when the SRMA is powered up from external power and completes initialization. The SRMA can provide the power-up notification using a data network connection if it is active or the SRMA can dial a configured telephone number on the PSTN network and provide the power-up notification. If the SRMA is connected to the same power source as other equipment then the SRMA is effectively monitoring the power supply for the other equipment as well.

The SRMA can also provide a means of "cycling" the power for another device such as a router. Allowing an administrator to power cycle a router and connect to the console port could save needing to send a technician to a remote site for certain operations such as password recovery. While logged into the SRMA the remote technician can cause the router to be power cycled and then connect to the console port to perform password recover.

In order to defend against denial-of-service attacks on the PSTN line the SRMA receives Caller ID on the calls it receives. If calls from the same phone number consecutively fail authentication a certain number of times, calls from that number will be answered and immediately disconnected for a certain length of time. Notification of the attack can be made over the management connection as well. If the SRMA does not have a management connection or the management connection is down the SRMA can be configured to report the attack by dialing a configured number and reporting the attack over the PSTN.

Figure 40:
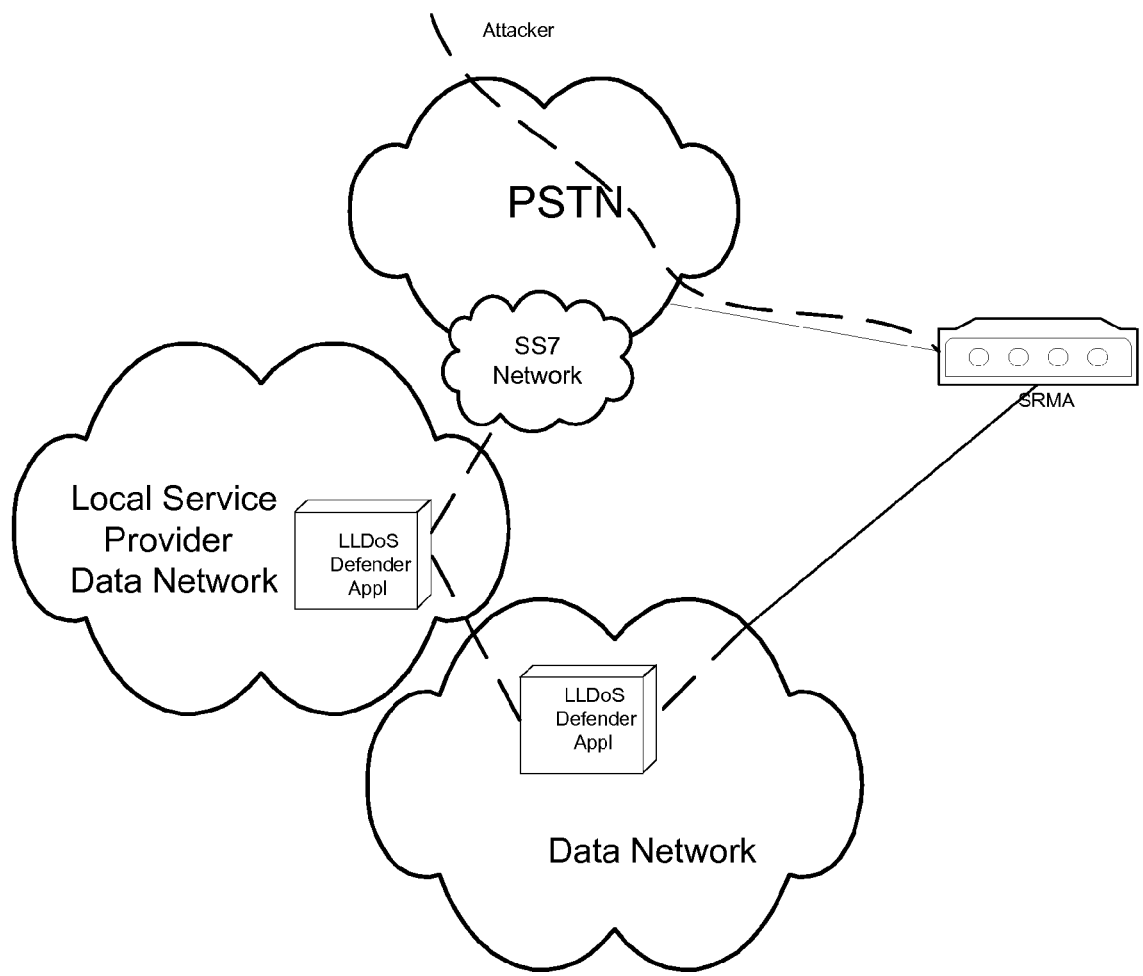
FIG. 40 illustrates the SRMA connectivity to an application to allow dynamic blocking of calls to the SRMA over the PSTN.

Another method of protecting against a denial-of-service attack on the PSTN line is for the SRMA to be able to securely connect to an application that works with the PSTN local loop provider to manage call blocking. This is depicted in FIG. 40. This application would allow a subscriber to dynamically change a list of numbers to allow or block calls from as well as change if calls without the calling number being available will be accepted. This application would allow PSTN numbers originating attacks to be blocked in the provider network leaving the local loop to the SRMA available for calls from authorized users.

The preferred exemplary embodiment of the SRMA of the present invention, as illustrated in FIGS. 18 through 20, comprises a management station to assist a remote network administrator in securely managing a networking device such as a router or switch in an environment such as that depicted in FIG. 17. The SRMA provides the remote operator with a number of capabilities that will be looked at individually. Having an embedded processor in the SRMA facilitates these capabilities. The embedded processor includes all the components necessary for stand-alone operation such random access memory (RAM), read-only memory (ROM), nonvolatile random access memory (NVRAM), and Flash memory. At times when the embedded processor receives signals from the analog block it will forward the signals to the serial port. At other times, as discussed below, the embedded processor will take other actions concerning signals received from the analog port.

The SRMA has one or more network ports for connection to a data network. This network connection could be a serial connection as depicted in FIG. 18, a LAN connection as depicted in FIGS. 19 and 20, or any other suitable network connection. The SRMA will run a suitable networking protocol such as IP over the network connection. This network connection allows the SRMA to take advantage of many services available in the network such as network management applications, Network Time Protocol Servers, Log Server, Access Control Servers, and providing remote access to the SRMA over the data network using HTTP, Telnet, or Secure Shell as well as others.

The SRMA has the capability to provide management information to a network management station. This could be implemented via standardized protocols such as SNMP or via proprietary protocols. The SRMA can be configured to allow a remote network management station to query the SRMA for information and/or for the SRMA to initiate sending information to the network management station. The SRMA can be configured to send selected information on a periodic basis as well as send selected information when specified threshold conditions are met or error conditions occur. This is referred to as setting traps for information to be sent. Some management protocols also allow operating parameters of the SRMA to be changed by the remote administrator using the protocol and the data network.

Using the data network connection the SRMA can have access to an NTP Server and a log server. The NTP server allows the SRMA to maintain an accurate time source and to use the time source for time stamping log information. The SRMA could also log events both locally and remotely at a log server over the network. Keeping proper log and audit information is a vital part of network management.

The in-band network connection also allows the remote network administrator to access the SRMA for monitoring and configuration management using the data network as well as through the analog line. The remote administrator could use Telnet, Secure Shell, or some other appropriate remote terminal protocol to access the SRMA. They would then be able to display information about the operation of the SRMA or change the configuration of the SRMA. This could save on toll charges for connecting to the SRMA. The SRMA can also be set up to allow the remote administrator to use HTTP, or HTTPS and their web browser to access the SRMA.

The in-band network connection on the SRMA would also allow a remote administrator to access a console port connected to the serial port of the SRMA over the data network. The remote administrator connects to the SRMA over the data network using a remote terminal program such as Telnet or Secure Shell or using HTTPS and then would establish a connection through the SRMA to the console port. This could save on toll charges for connecting to the console ports or remote devices.

An additional service the SRMA can utilize through the in-band connection is an Access Control Server (ACS). The SRMA will run a client for authentication and can communicate with one or more ACS using standardized protocols such as RADIUS or proprietary protocols. This would allow the SRMA to authenticate and authorize users connecting to the SRMA and determine their privileges on the SRMA and what ports they are authorized to connect to. If a protocol such as TACACS+ is being used the SRMA would also be able to provide accounting information to an ACS.

Figure 15:
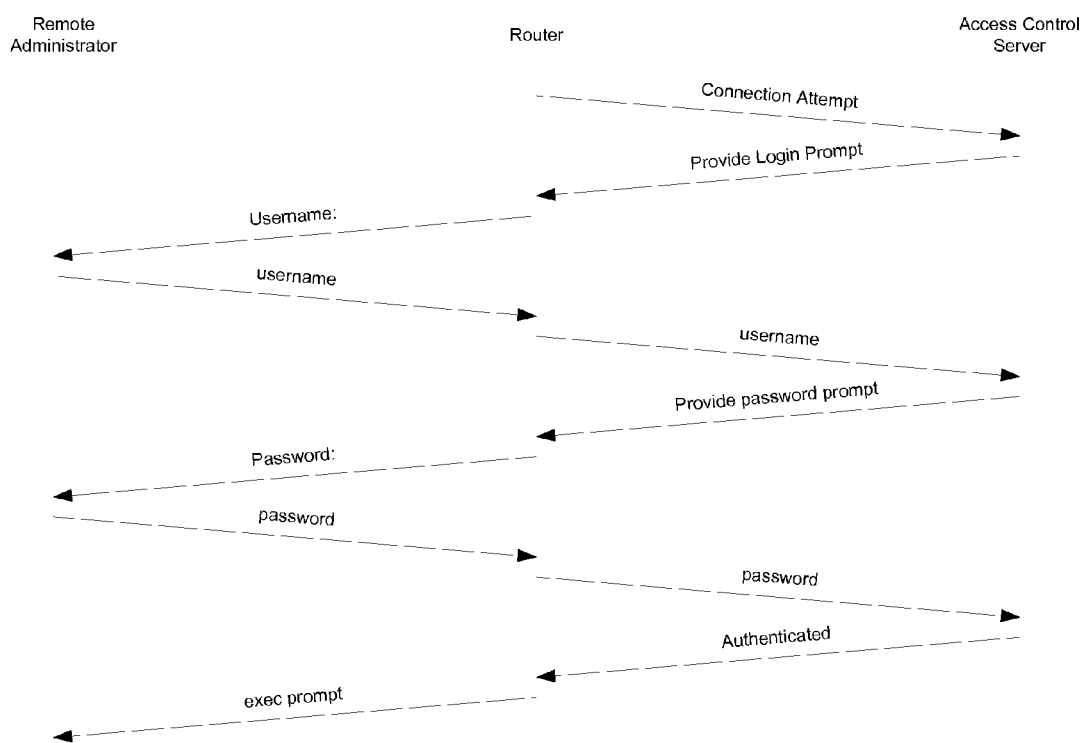
FIG. 15 illustrates typical password protection on a router using TACACS+ and an ACS.
Figure 16:
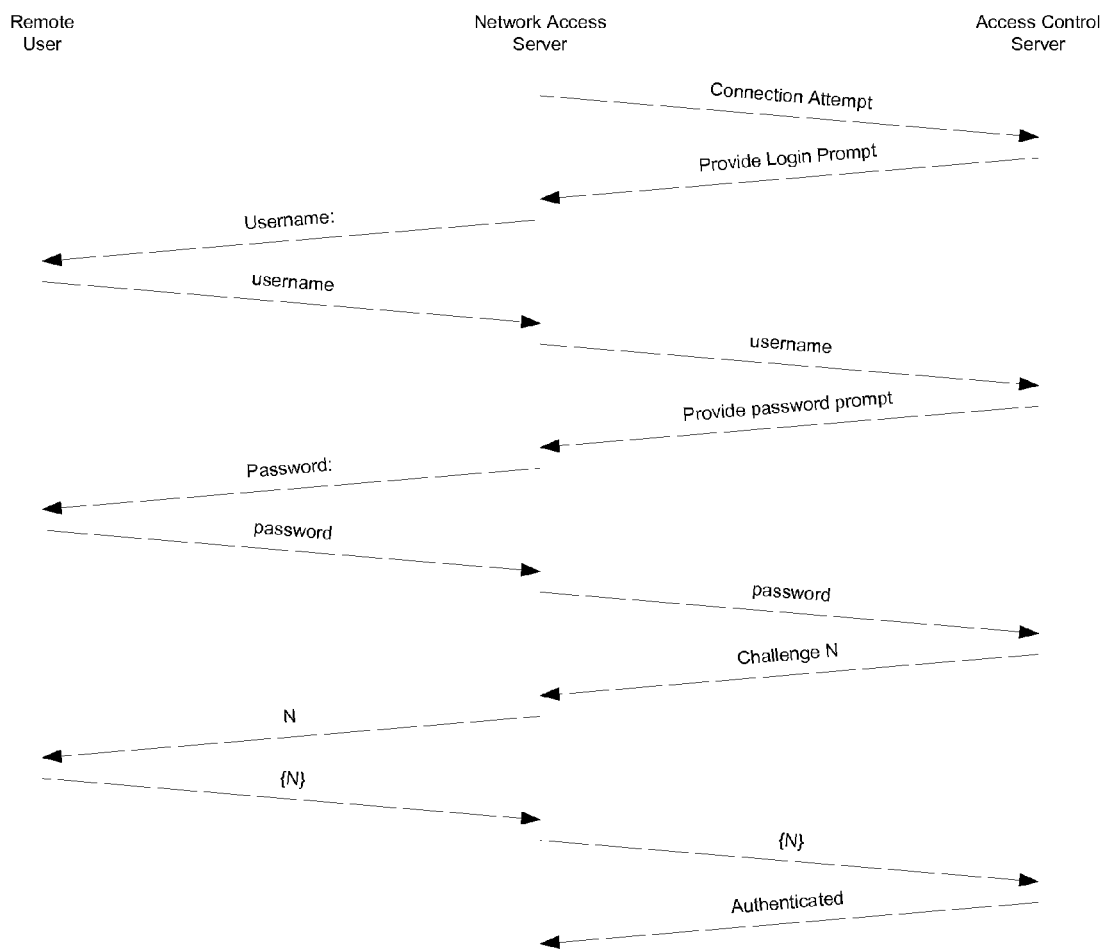
FIG. 16 illustrates typical password and challenge protection on a Network Access Server using RADIUS and an ACS.

The advantages of using an ACS connected over the network is the user information, passwords and privileges can be configured on one central system rather than having to be configured in every device in the network. For larger networks with a large number of administrators centralized authentication is mandatory. The SRMA would be able to perform authentication and authorization as depicted in FIGS. 15 and 16 using the connection to an ACS over the data network.

However, there are times when the SRMA may not be able to connect to an ACS. This could be cause by a portion of the path in the data network between the SRMA and the ACS being down causing the SRMA to not be able to use an ACS to authenticate or authorize users attempting to connect to the SRMA. The SRMA is not unique in experiencing this problem. Any device that uses an ACS for centralized authentication control shares it. The device must either not allow any users to connect, allow all users to connect, or perform authentication by some other means. A Cisco router, for instance, will have a list of methods for authentication. If the first method on the list is not available for authentication, then the second method is attempted. That method might be a local database on the device, which is not practical in a large network, or a common password everybody who ever needed to know it (and then some) knows.

The SRMA implements a new authentication and authorization method called ICM that can be used when the SRMA does not have connectivity to an ACS, though the SRMA can be configured to use ICM for authentication even when it does have connectivity to an ACS. In a large organization it would not be unreasonable to expect the remote administrator to have access to the data network and hence to an ACS. Therefore, an ACS can still be used to authenticate and authorize the user to the SRMA using the centralized database. Any device can use ICM when a user is attempting to connect to the device and it is reasonable to expect the user to have connectivity to an ACS.

In a preferred exemplary embodiment of ICM using public/private key pairs the SRMA or server for the connection holds a private key KS unique to itself and never reveals that key. Authentication servers on the network hold the public key Ks of the pair and they are free to distribute that key to others. The ACS servers on the network also hold a private key KACS from another public/private key pair for authentication and the SRMA or server holds the public key Kacs of the pair. It is preferred that each ACS has its own private key for authentication though it would also be possible for all the ACSs to share one private key for authentication. Another implementation would have the ACS hold a unique private key for each SRMA or server they are providing authentication for. The ACS also has access to the user information and their resource authorization information.

Figure 22:
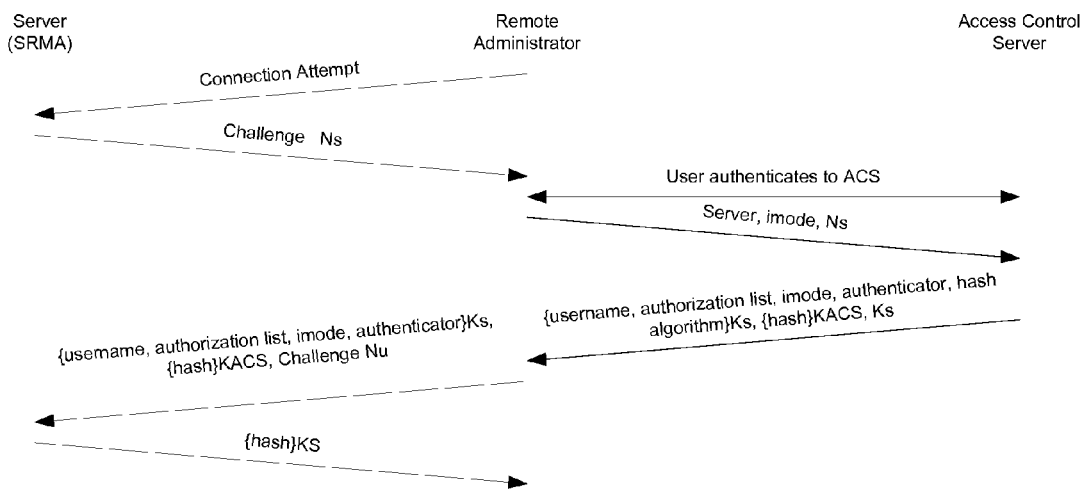
FIG. 22 shows sample flows used for an exemplary embodiment of Isolated Challenge Mode Authentication.

As depicted in FIG. 22, when a remote administrator or user attempts to connect to the SRMA, or any device implementing ICM authentication, the SRMA will issue a challenge typically in the form of a random number N. The subscript s is added to indicate this is a random number generated by the SRMA which is the server in this connection attempt. Ns is sent to the remote administrator or user attempting to connect to the SRMA. The remote administrator has connectivity to an ACS and has either already authenticated them self to the ACS or needs to do so at this time. How the remote administrator authenticates them self to the ACS is determined by the security policy for the network and can vary depending on the needs of the network and the security requirements for the information or device being accessed. The remote administrator will send to the ACS what SRMA or server they are trying to access, the initial mode they want to enter on authentication, and Ns sent to them by the SRMA. The ACS already has the information about the remote administrator.

The ACS will prepare a message to be sent to the SRMA via the remote administrator. This message will include the username of the administrator being authenticated, their authorization information, their initial mode to enter on authorization (can be defaulted), optionally the name of the ACS doing the authentication, and the hash algorithm the ACS is going to use. This information should be encrypted using the public key of the SRMA Ks in order to protect the confidentiality of the information being sent though it does not need to be encrypted for the integrity of the authentication process. The ACS will then generate a hash from the prepared message using the hash algorithm identified in the prepared message providing integrity for the information being sent and will encrypt the hash with its private key KACS. This will allow the SRMA to verify that the message has not been tampered with. The ACS will then send the message encrypted with Ks and the hash encrypted with KACS to the remote administrator. Optionally, the ACS can also send the remote administrator the SRMA's public key in order to allow the remote administrator to authenticate the SRMA.

The remote administrator will then send the message encrypted with Ks and the hash encrypted with KACS to the SRMA in response to the challenge Ns. If the remote administrator wants to authenticate the SRMA the remote administrator will also generate a challenge of its own Nu and include it in the message sent to the SRMA The SRMA can now use KS to decrypt the message encrypted with Ks and will know the username attempting to connect, their authorization, their initial mode of operation, the name of the ACS providing authentication, and the hash algorithm the ACS used. The ACS hashes this information along with the original challenge Ns. It also uses Kacs to decrypt the hash encrypted with KACS and compares the two hashes. If the two hashes are the same the SRMA knows the message is authentic and can act on it. If the remote administrator included a challenge Nu, the SRMA will encrypt the challenge with its private key KS and sent the result to the remote administrator. The SRMA will encrypt the challenge Nu with its private key Ks and return the result to the remote administrator. The remote administrator will then be able to use the public key sent to it by the ACS to decrypt the results returned by the SRMA to authenticate the SRMA. Because the ACS is trusted, the remote administrator only needs the public key itself and not the trust chain. Mutual authentication has taken place without any usernames or passwords being transmitted in the clear.

Figure 23:
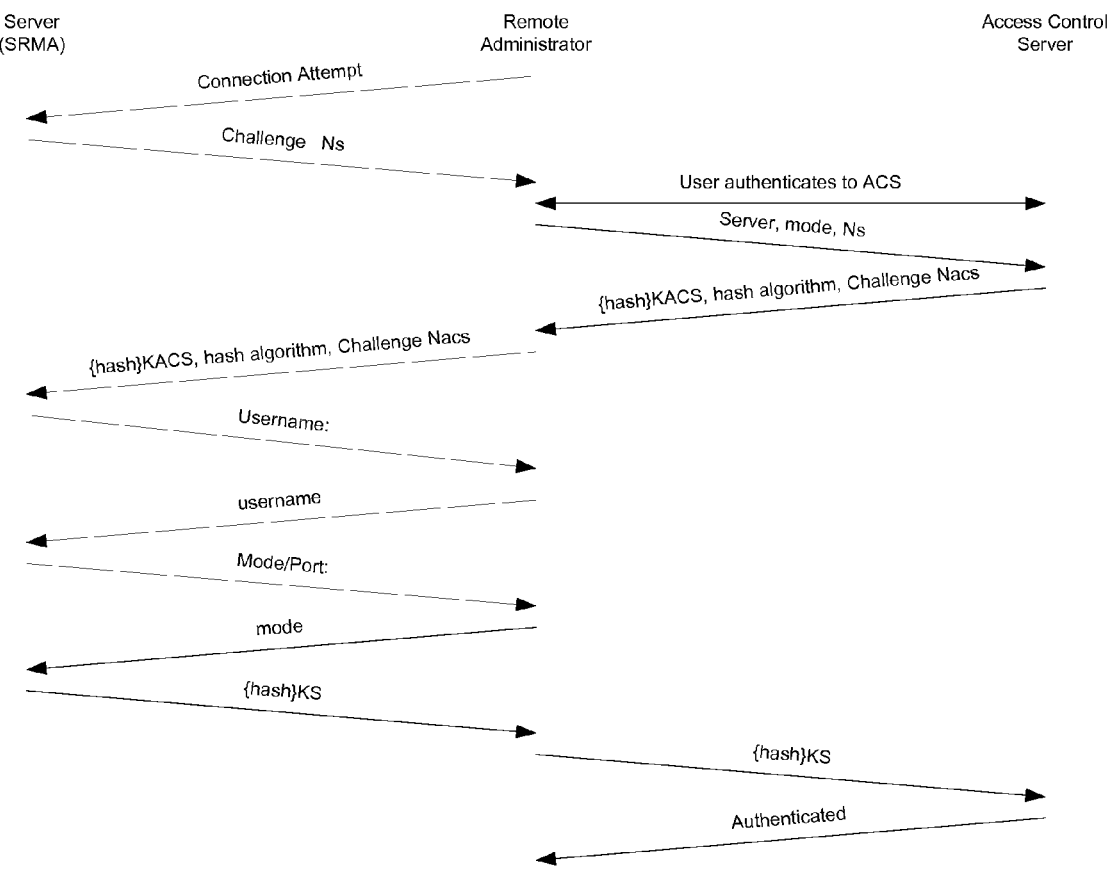
FIG. 23 shows sample flows for an additional exemplary embodiment of Isolated Challenge Mode Authentication.

A preferred exemplary embodiment of ICM can also include a provision for facilitating easier authentication for a user using cut and paste to transfer challenges and responses on their workstation. In this case it is important to limit the length of information transferred by the remote administrator. FIG. 23 illustrates a method for doing this. When the remote administrator attempts to connect to the SRMA the SRMA still responds with challenge Ns and the remote administrator still needs to be authenticated by the ACS by whatever means the security policy for the network requires. The remote administrator then communicates that it wants to authenticate using the ICM short form of authentication and provides the name of the SRMA, the mode/port it wants to be authenticated for, and the challenge Ns it received from the SRMA.

The ACS server hashes the username, mode/port, and Ns using a selected hash algorithm. The ACS then encrypts the hash using private key KACS and sends the encrypted hash, the name of the hash algorithm, and a new challenge for the SRMA Nacs (if mutual authentication is required) to the remote administrator. The remote administrator can then cut and paste the message into their terminal emulator to send to the SRMA.

The SRMA will then prompt the remote administrator for their username, and the mode/port the want access to. After the remote administrator has provide this information the SRMA will hash the username, mode/port, and Ns using the hash algorithm specified in the message from the ACS via the remote administrator. The SRMA also decrypts the hash sent by the ACS using Kacs and compares the two hashes. If the hashes match the information provided is authenticated.

If Nacs was provided then the ACS wants to authenticate the SRMA. The SRMA will use the hash algorithm used by the ACS to hash the server name and Nacs and will encrypt the hash with the SRMA private key KS and send the result to the remote administrator. The remote administrator will send the encrypted hash to the ACS. The ACS will decrypt the hash with key Ks and compare the hash to its own hash of server name and Nacs. If they match the ACS sends a message to the remote administrator that the SRMA is authenticated.

As indicated above, the ICM authentication and authorization can be used in environments other than a remote administrator connecting to an SRMA. Anytime a user or device that has access to an ACS is attempting to connect to another device ICM can be used. If the device being connected does not have connectivity to an ACS then ICM will allow the device to use a centralized database to authenticate the connecting device (and to authenticate the device being connected to).

An example of when this might be useful would include a Cisco router that is configured to use TACACS+ as its first choice for authentication. A typical second choice when TACACS+ is not available might be to use the enable or secret password. However, in a large organization, the enable password might not be very secure. With ICM, the second choice could be ICM using the same centralized user database that TACACS+ uses for authentication.

Another example of when ICM could be useful would be for backup links in an outage situation. If there are a number of ISDN links from a customers central hub to remote sites and the primary connectivity is for instance frame relay and the central hubs frame relay access circuit goes down. The central hub might not have enough ISDN circuits to restore all the connections to remote sites and the central hub will want to make a decision on which remote sites to bring up ISDN backup links to. The central hub will be initiating connections to remote sites that are quite possibly isolated from an ACS. ICM would allow the remote isolated device to authenticate that the central hub is indeed the central hub.

When using cryptography, key distribution is always a consideration. An SRMA will need to be configured with its private key KS. It will also need to be configured with the public keys Kacs of any ACS private key that can be used for authentication and authorization of users. If a new ACS is added with a new private key KACS or an old key is compromised or not longer valid, the list of public keys on the SRMA needs to be updated. Also, if the SRMA private key becomes compromised it will need to be changed. In this preferred exemplary embodiment the privilege of changing and maintaining the public and private keys is reserved for the Network Security Administrator role. The SRMA can be configured to not allow the ACS servers to authenticate the Network Security Administrator role, but rather to maintain a separate public key Kns for authenticating a Network Security Administrator. This way the compromise of an ACS private key will not allow an intruder to change the keys on an SRMA. Only a Network Security Administrator can do that. If, however, the Network Security Administrator private key becomes compromised and an intruder changes the keys on an SRMA before the compromised keys can be changed, physical access to the SRMA will be required to restore the SRMA.

After a user is authenticated, they can be authorized for specific resources on the SRMA. These resources can include the different ports of the SRMA, the different roles of a user on the SRMA such as SRMA operator, SRMA Network Administrator, or SRMA Network Security Administrator, or for different functions of the SRMA such as power cycling a device. Each user can be authorized or not for the individual ports, roles, or functions.

After a user is authenticated to the SRMA the SRMA will go into an initial mode of operation. Some of the modes of operation would include connecting the user to a port in a pass through mode of operation where the data link connection is between the authenticated user and the device on the other end of the port, connecting the user to a port in a secure mode where the SRMA terminates the Data Link Control (DLC) from the user on the SRMA and performs encryption between the user and the SRMA and then passes the data to the port unencrypted, or one of the administrative modes on the SRMA itself such as Network Operator, Network Administrator, or Network Security Operator.

The SRMA will operate in a different role for the different modes of operation. The different roles the SRMA can function in are illustrated in FIGS. 24 through 27.

Figure 24:
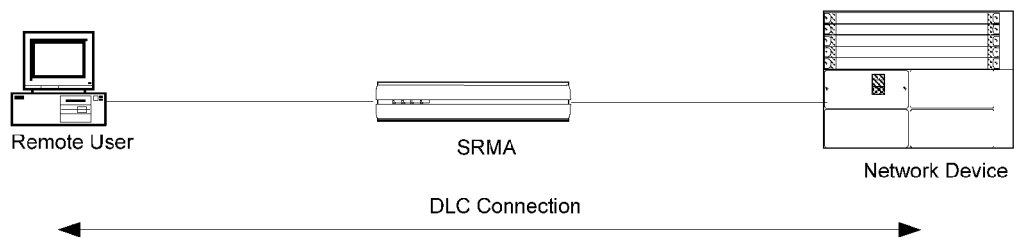
FIG. 24 shows the SRMA in pass through mode.

FIG. 24 illustrates the SRMA operating in pass through mode. In this mode of operation, the SRMA is operating at the physical layer. The signals from/to the PSTN network are demodulated/modulated and the DLC layer connection is established between the remote user and the network device. The SRMA can be configured to automatically be in this mode and not even challenge the remote user. In this case the SRMA would be functioning as a traditional modem. The SRMA could also be configured to enter this state after the user has been authenticated.

Figure 25:
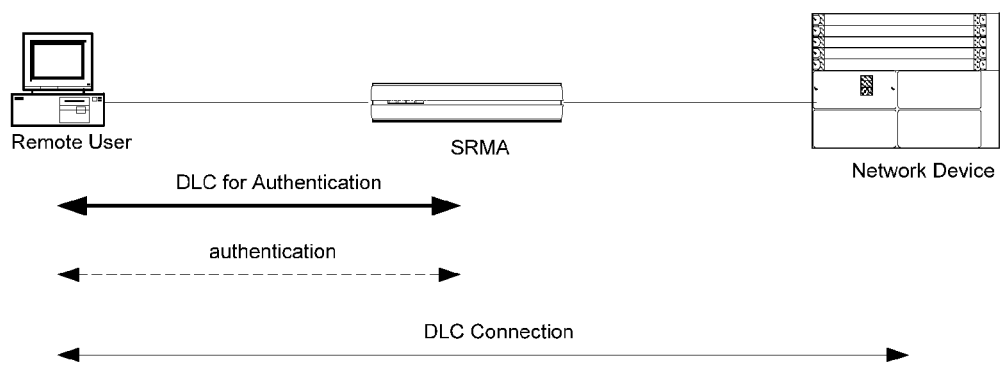
FIG. 25 shows the SRMA in authenticated pass through mode.

FIG. 25 illustrates the SRMA operating in verified pass through mode. In this mode the remote user establishes an initial connection to the SRMA itself. The SRMA authenticates the remote user and optionally authenticates itself to the remote user. Once authentication is complete the SRMA no longer participates in DLC level functions and reverts back to being a link level device.

Figure 26:
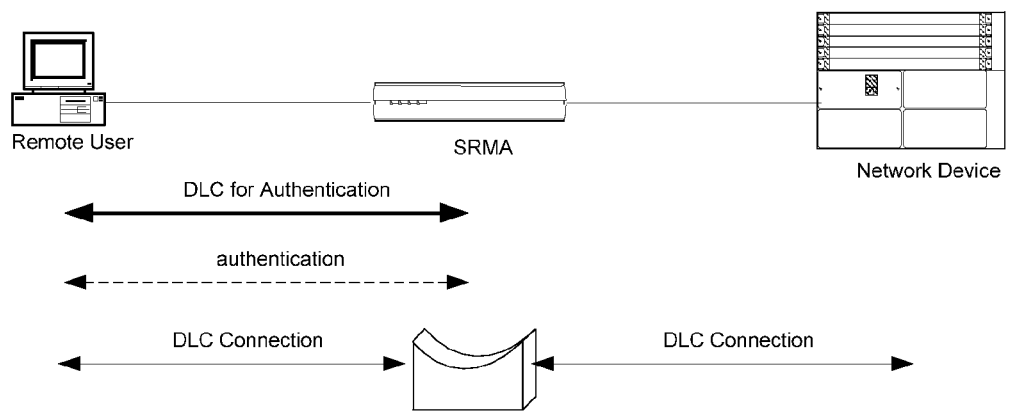
FIG. 26 shows the SRMA acting as a logical bridge for the connection from the remote user to the network device.

There are times when it is advantageous to have the SRMA continue to terminate the DLC to the remote user and act as a bridge to the network device. This is illustrated in FIG. 26. For instance, if the SRMA is being used to manage multiple devices and the remote user is to be able to jump between the devices using control characters to exit a connection to a device, the SRMA would act as a bridge at the DLS level.

Figure 27:
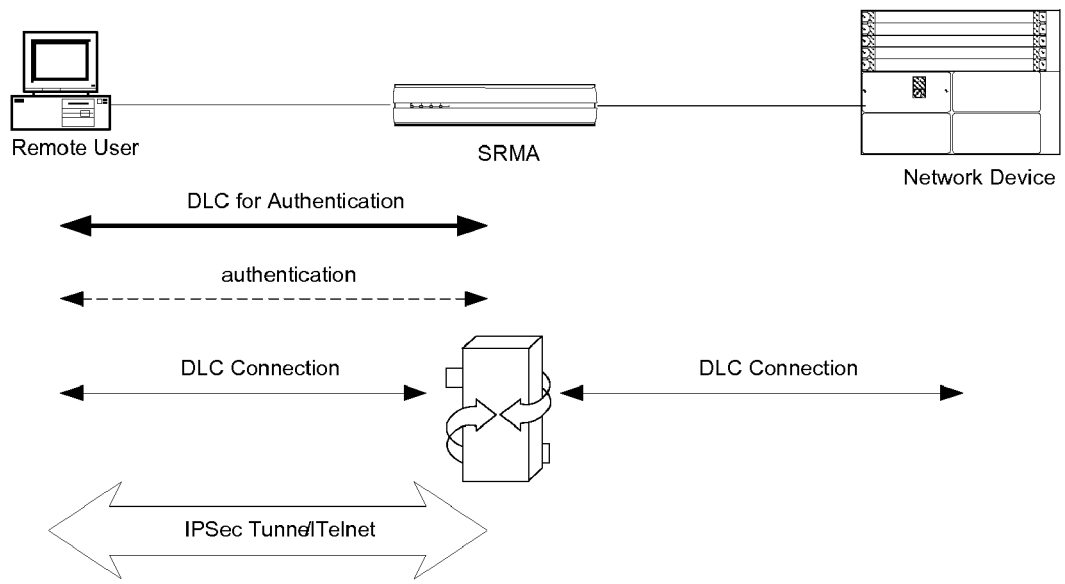
FIG. 27 shows the SRMA acting as an application gateway with a secure network level connection from the remote user to the SRMA.

If the traffic between the remote user and the network device were going to be encapsulated in a layer 3 protocol such as IP then the SRMA would function as a router. However, in a preferred exemplary embodiment a protocol such as IPSec would be encrypting the user traffic between the remote user and the SRMA at layer 3 and an application such as Telnet would be running between the remote user and the SRMA over the IPSec tunnel. The SRMA would then be acting as an application level gateway to deliver the user traffic to/from the network device in clear text using an application such as a terminal emulator. This is illustrated in FIG. 27.

Figure 28:
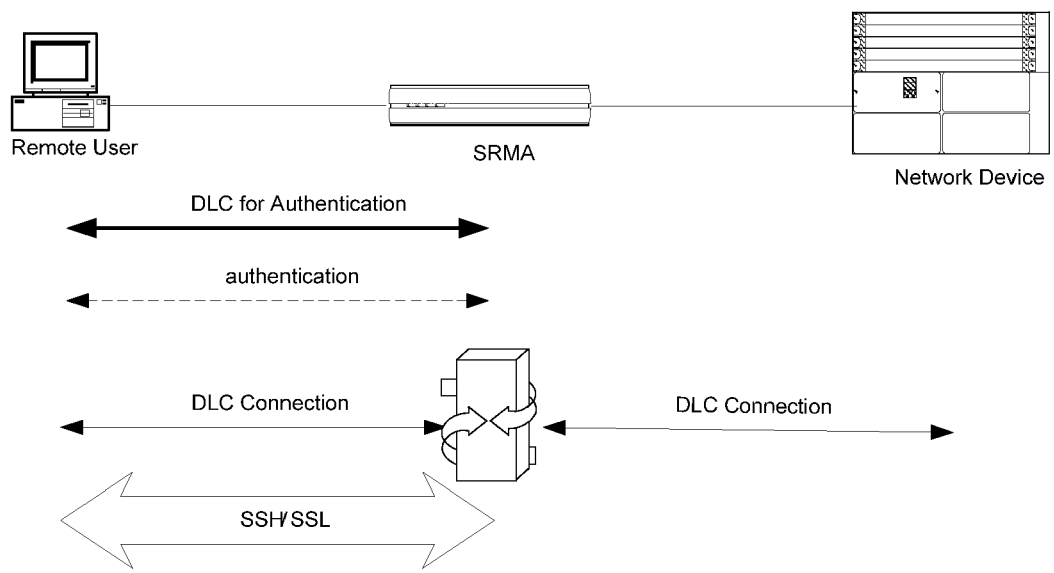
FIG. 28 shows the SRMA acting as an application gateway with a secure application level connection from the remote user to the SRMA.
Figure 29:
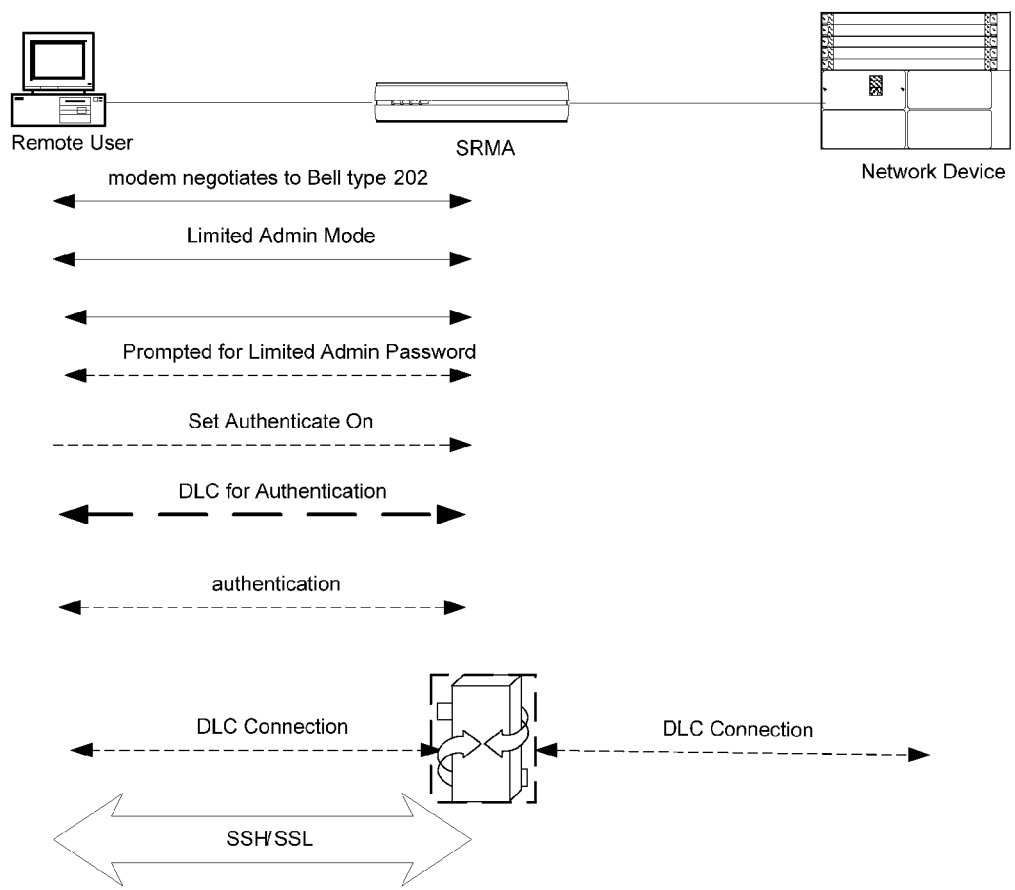
FIG. 29 illustrates using modem parameter negotiation to modify the operating mode of the SRMA
Figure 30:
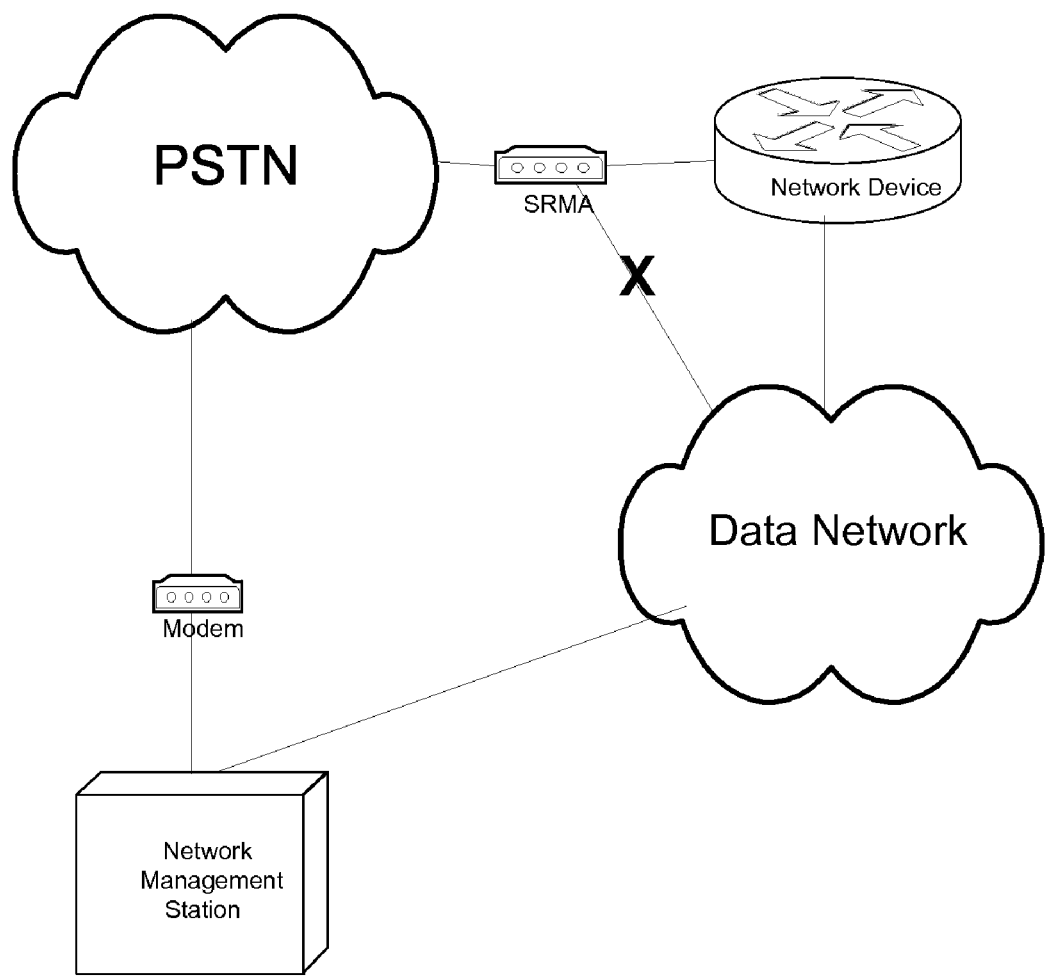
FIG. 30 illustrates the SRMA connecting directly to a network management station over the PSTN to report network status information.
Figure 31:
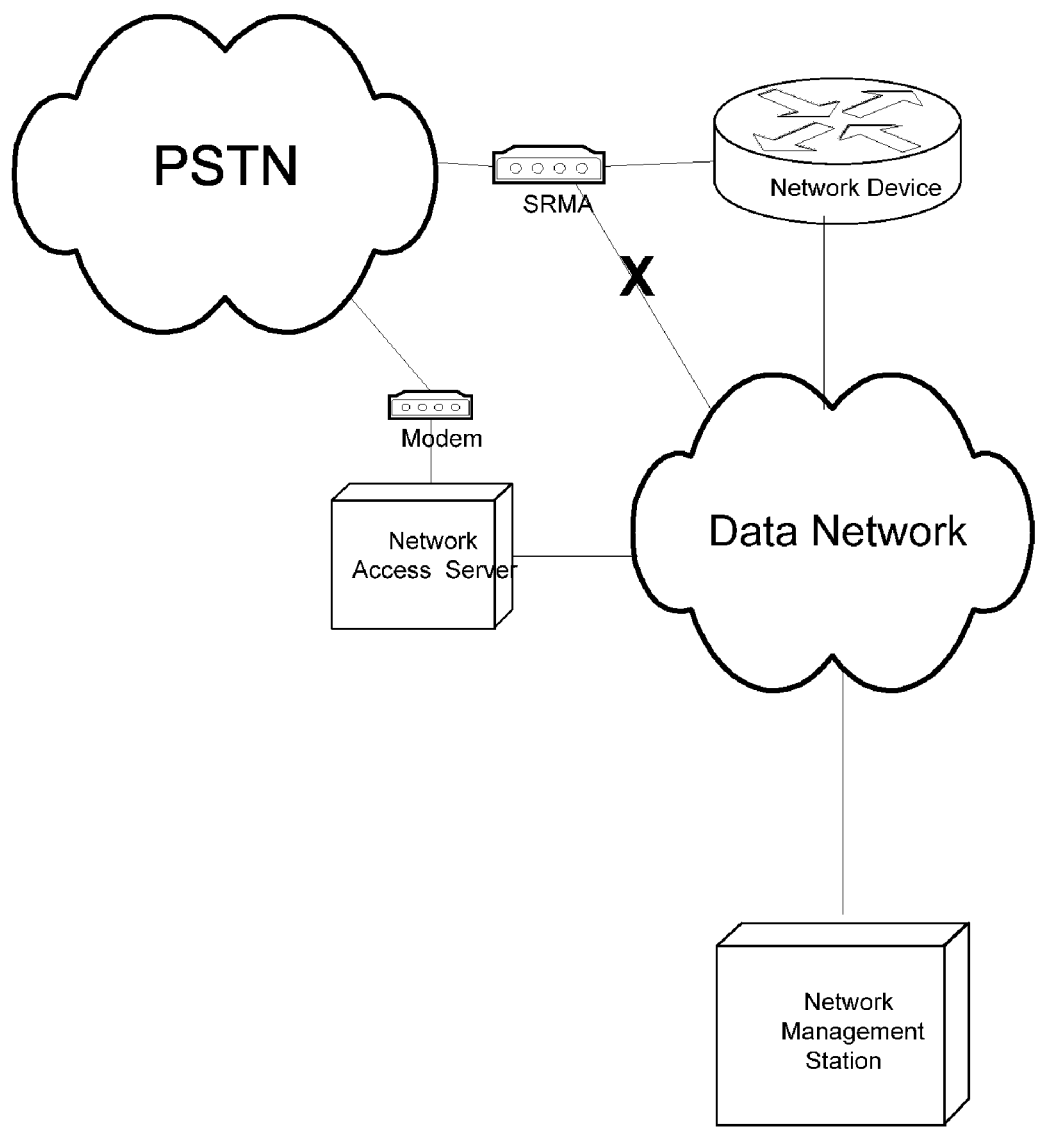
FIG. 31 illustrates the SRMA connecting over the PSTN to a NAS to establish connectivity to a Network Management Station.

FIG. 28 illustrates another application level gateway embodiment. In this embodiment, a TCP/IP connection is established between the remote user and the SRMA and then an application such as SSH is run between the user and the SRMA. In this embodiment the encryption of the user traffic between the remote user and the SRMA is performed by the secure shell application. The SRMA would deliver the traffic in clear text to/from the network device using an application such as a terminal server.

When the SRMA is configured to operate in pass through mode without user authentication, the user dialing in over the PSTN connection is not given the opportunity to elect to connect to the SRMA for administrative purposes rather than connecting to the network device port. In general, this would not be a problem because the network administrator could use the in-band connection of the SRMA to connect to the SRMA for administration of the SRMA. However, if the in-band connection were down, not connected, or not implemented on the SRMA this would not be an option. In order to allow the SRMA to remotely be changed from pass through mode to an administrative mode one of the modem negotiation settings is reserved for a limited administrative mode. For instance, if the modem type negotiated to a 1200-baud Bell type 202 modem, then the SRMA would enter the limited administration mode. The main feature of the limited administration mode is that it allows a remote user to set the SRMA out of pass through mode so that then can then enter an authentication mode.

To recover the SRMA from pass through mode over the PSTN line the remote user would configure their modem to use the configured modem type reserved for Limited Admin operation. This would cause the modems to negotiate to this setting. The SRMA would come up in Limited Admin mode and would request the remote user to enter a password. This password will travel over the PSTN in the clear so should be changed after Limited Admin Mode has been used. The remote user will enter the password and will then have access to the Limited Admin command set. The command set will include the command to set the SRMA to authentication mode (SET AUTHENTICATE). Other command may also be included in the Limited Admin command set.

Once the SET AUTHENTICATE command has been executed, the SRMA will begin normal authentication. The remote user can continue to establish a session over this connection or they can hang up and call back to establish a new connection with renegotiated modem settings. The SRMA remains in authentication mode until it is explicitly reconfigured for pass through mode.

In general, forcing the modem parameter negotiations to pre-selected values can be used to select different modes of operation. The above example was when the SRMA was set to pass through mode and the modem negotiation was used to force the SRMA to a limited administration state. The same method could be used if the SRMA was configured to automatically connect to an application on the SRMA such as a web application. The modem parameter negotiations could be used to change the connection to a terminal emulation session or again to a limited administration mode.

In general, the SRMA will typically report ongoing network status information and alerts to a network management station using a protocol such as SNMP by the in-band network connection. However, there are times when the SRMA will report network status information and alerts over the out-of-band connection such as the PSTN. Typically, this would occur when the SRMA has lost connectivity to the Network Management Station via the in-band connection. One primary condition the SRMA might want to report in this manner would be the failure of the SRMA in-band connection. Another event might be the loss of power to the site since the in-band connection could well be down due to the loss of power. To send the alert via the out-of-band connection, the SRMA would initiate a connection over the out-of-band network to either the Network Management Station or to a Network Access Server (NAS) for the in-band network. Once this connection is established, the SRMA can send the alerts or status information to the Network Management Station over the out-of-band connection.

As indicated above, one of the events that it might make sense to report over the out-of-band connection would be the loss of power at the site. The SRMA can be configured to report the loss of its main external power supply. Upon detecting loss of power from the main power supply, the SRMA would be configured to dial a specific Network Management Station to report the outage. This could be the same or a different Network Management Station the SRMA uses for reporting other information. This would provide a Network Management Center quick notification that the underlying cause of a network problem is a power outage at the remote location. This can save significant time during the problem determination process and help get the proper personal involved more quickly.

The most straightforward way to provide the SRMA with power for reporting the power outage would be to build a small uninterrupted power supply (UPS) into the SRMA. This UPS would provide the SRMA with limited time to establish a connection to the Network Management Station over the out-of-band connection, report the outage, and possibly report any log information stored on the SRMA before taking down the connection. The SRMA would then be available for connections from Remote Administrators via the out-of-band connection for further problem determination as long as the power in the UPS lasted.

Another exemplary embodiment for providing power for reporting the power outage at the site is to use line-powered equipment. There are a number of line-powered modems on the market today. A relay held open by the power from the main external power supply would close when the power fails, connecting the line-powered equipment to the telephone line and the power supply associated with the telephone line. The line-powered circuitry would be configured to establish a connection with a Network Management Station and report the power loss. Using a line-powered modem would eliminate the need for a UPS and would not limit the length of time a connection could be established to the Network Management Station or a Remote Administrator. However, the functionality of the line-powered equipment might be limited and there would be the expense of the line-powered circuitry instead of the cost of the UPS.

The SRMA can also be configured to provide notification to the Network Management Station when power is restored to the site. When power is restored, the SRMA can be configured to wait a determined length of time (perhaps on the order of minutes) to give the network device time to boot and the in-band connection time to reestablish. At the end of that time the SRMA will check the in-band connection. If the in-band connection is up and the SRMA has connectivity to the Network Management Station via the in-band connection, the SRMA will send the notification of power restoration to the Network Management Station via the in-band connection. If the in-band connection is not up or the SRMA cannot reach the Network Management Station via the in-band connection, then the SRMA will establish a connection over the out-of-band connection to report the power restoration.

The SRMA can be configured to monitor the connection to the network device console port. Monitoring the electrical characteristics of the connection can allow for the detection of a cable being disconnected. Even with the use of a modem eliminator such as is commonly used when the connection to the console port of a network device than may be configured as a DCE and the port on the SRMA is also configured to be a DCE, the electrical characteristics of certain pins can be monitored to assure the network device is connected. For instance, if a 9 pin D-shell connection is used for an RS-232 connection, the DTR signal (pin 4) could be monitored for voltage. Even with a modem eliminator, the remote device should be applying to the DTR signal pin of the SRMA. If no voltage is being applied to this pin, the SRMA can be configured to send an alert.

The SRMA can be configured to monitor the traffic to and from the console of the attached network device since it is always connected to the port. This allows for ongoing monitoring and/or logging of events involving the console. Commands a remote user sends to the console can be logged and the response to those commands can be logged. In addition to monitoring commands from a remote administrator to a console and the results returned, the SRMA can monitor messages sent to the console while no remote administrator is logged on.

The SRMA can filter the messages sent to the console and generate an alert or trap when certain messages are returned. For instance if the SRMA detects messages associated with the boot process of a device, the SRMA can generate an alert that the device just reloaded. If the SRMA sees a console message indicating a particular interface has gone down on a device, the SRMA can generate an alert. This could be useful if the interface that went down was the interface the device would normally use to send network management traffic over.

Based on the authorization level afforded to the remote administrator, the SRMA could also filter what commands the remote administrator is allowed to issue to the network device. For instance, some administrators might be precluded from entering the ENABLE mode on a Cisco router. Having this ability to filter commands could be useful if the authentication and authorization methods on the SRMA are stronger than the authentication and authorization methods on the device.

Another advantage of the SRMA is that an SRMA administrator can set up macro commands on the SRMA. The administrator can also configure the SRMA to execute some commands at the beginning of a connection of a remote administrator to a network device console port and/or at the end of a connection to a network device console port. This can be used to plug a major hole in the security of allowing remote connectivity to the console port of a Cisco router or switch. Since the console port of the device can not tell when a connection drops, if a connection does drop and a new user connects in, the new user will have the authority and privileges of the prior user without having logged in. However, the SRMA does know when the connection dropped and can execute a macro to log the user out before another user can connect in. General macros that a remote administrate could execute could also be configured.

A remote administrator can also use the in-band data network to connect to the console port of a network device attached to an SRMA. By using a network based application such as Telnet, or SSH, or HTTP, the remote administrator can connect to the SRMA and the SRMA can then connect them to the console port of the router. By using a secure application such as SSH or HTTPS or by using secure paths through the network such as IPSec tunnels, the communications between the remote administrator and the SRMA can be secure. Then the only place the traffic would pass in the clear would be between the SRMA and the console. Since the SRMA and the network device should be collocated, the portion of the traffic path that was the most vulnerable has just been secured. Allowing in-band connections like this can save on toll calls, and can also allow a remote administrator connect at higher speeds and they can have connections to multiple systems without having multiple modems.

It is also possible for a remote administrator to connect to the SRMA through the in-band data network and then through the SRMA connect to the network device again through the SRMA in-band connection to the data network to a virtual terminal (VTY) port on the network device. The connection from the remote administrator to the SRMA can be secure and then a protocol such as Telnet can be used to connect from the SRMA to the network device. This allows for the majority of the network path to be secure. The only portion of the traffic path that would be insecure should be a LAN segment between the SRMA and the network device. If the SRMA in-band connection were a back-to-back cable to a port on the network device, then the only portion of the traffic path that would be insecure would be the cable. This allows for more secure connections to the VTY ports on a network device. Since many network devices do not support secure logins like SSH the SRMA can provide the needed security. VTY ports can allow more than one user to be logged into the device at the same time while only one user can be logged into the console port at a time.

The SRMA can also monitor the physical connectivity of a telephone line to the SRMA and send an alert if the telephone line is disconnected. Often the SRMA is in place to assist with problem determination and resolution when there is an outage in the network. It might be that the telephone connection to the SRMA does not get used very often. It is not unheard of for a telephone line to a modem on a console port to have gone for weeks and months without working and no one noticing. When it is needed, such as when there is an outage, it is important to know that the telephone connection will be there and working. Monitoring the connection to the line assists in doing this.

When a telephone line is in the on-hook state, the line generally carries a voltage. In the USA this is in the vicinity of −48V. To monitor a line that is in the on-hook state it is important to draw very little current if any at all. A FET transistor circuit would be a good candidate for this circuit. A connection from the telephone line would be connected to the gate of the FET transistor. While a high enough negative voltage was maintained on the line, the FET would be in pinch off state and no current would flow between the source and the drain. If the negative voltage was removed from the line and the voltage at the gate went to zero, the FET would allow current to begin flowing between the source and the drain on the transistor. The circuit could detect the flowing current or the circuit could be designed so that the current flow caused a voltage drop at the output to the circuit. This voltage drop could be noted and used to trigger an alert that the line has been disconnected while at the same time drawing very little if any current in the steady state condition. This circuit would provide the most accurate indication of the status of the connectivity of the telephone line when the modem portion of the SRMA is in the on hook state.

In situations where it is desirable not to physically monitor the voltage on the telephone line a method for periodically monitoring the status of the telephone line is possible. The SRMA can be configured to periodically go offshoot and dial a telephone number to test for line status. If no telephone number is provided to dial the SRMA can go offshoot and monitor for dial tone. If dial tone is returned the SRMA will consider the line still connected. While this will not provide for continuous monitoring of the connectivity, it will still detect the line being disconnected in a timely manner. If the telephone line is currently in use for a connection the SRMA will consider the line connected and will not need to do the test. The frequency at which this test is performed can be configured.

The SRMA also provides for additional testing of the ability to send and receive calls over the out-of-band network. A portion of a distributed Call Test application resides on the SRMA to assist with call testing. Another portion of the Call Test application resides on a Call Test Server in the Data Network. The Call Test Server also has connectivity to the out-of-band network. The SRMA can be configured to periodically test its ability to send and/or receive calls, or the Call Test Server can be configured to periodically test the ability of the SRMA to send and receive calls. A test can also be explicitly started from either party.

When either side is beginning a test it establishes an application connection with the other party over the Data Network. For instance, if the SRMA were initiating the test, it would initiate a connection to the Call Test Server. To test the ability of the SRMA to receive calls, the SRMA or the Call Test Server would send a Call Test In request over the data network connection and the other party would replay with an available if it is available for a test at that time. If it were not available, the other party would reply with a busy response. Either on the Call Test In request or the Available reply the SRMA will indicate its number to the Server that the server is to call. If the Server has a database of SRMA phone numbers it will verify that this number matches. The Server will then place a call to the SRMA over the out-of-band connection. Since the SRMA is expecting the call from the Call Test Server, it will connect the call to the Call Test application on the SRMA. The Call Test Server will then transmit some random data to the SRMA over the out-of-band connection. The SRMA will then send this random data to the Call Test Server over the in-band connection. If the data matches, the Call Test Server will send a VERIFIED message to the SRMA over the in-band connection to indicate the test was successful.

To test the ability of the SRMA to place calls, after the in-band connection has been established, the SRMA or the Call Test Server will send a Call-Test-Out request over the in-band connection. The other party will reply with an Available message if they are available for a test at that time. If they are not available at that time they will respond with a Busy message. On either the Call-Test-Out message or the Available message the Call Test Server will provide the SRMA with the phone number to call for the test. The SRMA will then place a test call to the Call Test Server over the out-of-band network. When the server answers, the SRMA will transmit some random data over the out-of-band connection. The Call Test Server will then send the test data to the SRMA over the in-band connection. If the data is the same then the SRMA will transmit a Verified message to the Call Test Server over the in-band connection to indicate the test was successful. While it doesn't matter which side sends the random data, this exemplary embodiment has the side placing the call also sending the random data.

The SRMA also provides a means to power cycle the network device. The network device can be connected to its power supply through the SRMA. The SRMA will have a relay inline between the power supply and the network device. When the remote administrator requests a device be power cycled the relay is opened disrupting the power supply to the device. The power is then restored to the device and the remote operator has connectivity to the device console to view boot messages and/or enter commands to perform password recovery remotely. In the event of a network device that has dual power supplies, a version of the SRMA can have two power sources coming in and feed two supplies to the device. When an authorized remote operator requests the power to be cycles, the SRMA will disrupt both power supplies simultaneously.

For the SRMA to be as beneficial as possible it is important for the out-of-band connection to be available for legitimate traffic. This access could be taken away by an attack on the local loop connecting the SRMA to the PSTN local service provider. If an unauthorized user dials in repeatedly, even though they do not get authorized, they are still tying up the local loop connecting the SRMA to the out-of-band network. In fact large ISPs have come under attack by Distributed DoS attacks where illegitimate traffic ties up their modem pools so the legitimate users cannot get access to the ISP. I will refer to this as Local Loop DoS (LLDoS).

A first step in LLDoS protection is to monitor Caller ID and to note the Caller ID of connections that failed to authenticate. If a set number of failures from that number occur without any successful authentications from that number then the SRMA will not longer attempt to authenticate calls from that number for a set length of time. Instead, the SRMA will simply answer and immediately hang up on that number. The SRMA can also be configured to reject calls that are marked a P or O for a set length of time when the SRMA is under attack.

An alternative solution for LLDoS protection is for the SRMA to have connectivity to an LLDoS Defender application in the Data Network. When the SRMA has a call that fails to authenticate, it reports the calling number to the LLDoS defender application. Even if the calling number is not available, the SRMA reports P and O calls that did not authenticate. If the SRMA or the network appears to be under an LLDoS attack, the LLDoS Defender application talks with an LLDoS defender application in the Local Telephone Service Provider network to report a potential attack is taking place. The LLDoS Defender application in the Data Network provides the LLDoS Defender application in the Service Provider's network with a list of calling numbers it wants blocked from calling the SRMA.

In addition, the defender application can indicate that it wants the Service provider to block the last call the SRMA received even if the Caller ID was blocked so that the SRMA does not know the number. The service provider still knows the number and can block the caller. When the defender application requests a Caller ID blocked call to be blocked, the defender application is given a reference number for that caller since the actual phone number cannot be released by the service provider. This way the defender application can unblock the caller by the reference number if it chooses to do so. The defender application can also request that all P and O calls be blocked.

In addition to providing a list of callers to block, the defender application can notify the service provider that an attack is taking place and request that the service provider begin collecting forensic data. This way additional data could be available to proper authorities is it is determined an attack took place and they need to investigate.

In the event that the SRMA is not able to connect to the LLDoS Defender application through a Data Network connection, and the SRMA comes under attack, the SRMA can attempt to dial out between attack calls and call either the LLDoS Defender application directly or call a NAS to connect to the LLDoS Defender application and report that an attack seems to be under way and provide a list of attacking numbers.

While the description above refers to particular embodiments of the present invention, it will be understood that many modifications may be made without departing from the spirit thereof. The accompanying claims are intended to cover such modifications as would fall within the true scope and spirit of the present invention.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and That which is claimed:

1. An apparatus for controlling access to management applications on devices in a communication network and securely conveying device management traffic to and from said management applications in a distributed computer network including one or more management information communication partners, one or more devices, and one or more communication networks, said apparatus comprising:
   one or more processor;
   a memory element;
   one or more management connection means;
   one or more in-band connection means; and
   one or more out-of-band connection means;
   said management information communication partners selected from the group comprising:
      one or more network servers providing services that assist with managing one or more of said devices in said distributed computer network; and
      one or more administrators managing one or more of said devices in said distributed computer network;
   said management connection means configured for operatively coupling with managed devices thereby enabling the conveyance of said device management traffic to and from said managed devices;
   said managed devices selected from the group comprising one or more of said devices in the distributed computer network;
   said in-band connection means configured for operatively coupling with one or more of said communication networks thereby enabling the conveyance of said device management traffic to and from said management information communication partners;
   said out-of-band connection means configured for operatively coupling with one or more of said communication networks thereby enabling the conveyance of said device management traffic to and from said management information communication partners;
   wherein said apparatus is configured for conveying said device management traffic between one or more of said management information communication partners and one or more of said managed devices;
   wherein said device management traffic is conveyed between said management applications and said management information communications partners utilizing either one or more of said in-band connection means or one or more of said out-of-band connection means;
   wherein one or more of said in-band connection means comprises the primary means for conveying said device management traffic and one or more of said out-of-band connection means comprises the secondary means for conveying said device management traffic;
   wherein, when one or more of said primary means for conveying said device management traffic is available, said primary means is utilized for conveying said device management traffic, and wherein one or more of said secondary means for conveying said device management traffic is utilized for conveying said device management traffic when said one or more primary means for conveying said device management traffic is not available for conveying said device management traffic.

2. The apparatus of claim 1, wherein said management connection means is selected from the group comprising:
   one or more console connections; and
   one or more dedicated management segments.

3. The apparatus of claim 1, wherein said apparatus is configured for blocking traffic to said managed devices that is not from said management information communications partners.

4. The apparatus of claim 1, wherein said device management traffic utilizes one or more of the communications protocols selected from the group comprising:
   Internet Control Message Protocol (ICMP);
   TELNET;
   Secure Shell (SSH);
   Hypertext Transfer Protocol (HTTP);
   Hypertext Transfer Protocol over Secure Socket Layer (HTTPS);
   Domain Name Services (DNS);
   Network Time Protocol (NTP);
   Simple Network Management Protocol (SNMP);
   SYSLOG;
   Remote Authentication Dial-In User Services (RADIUS); and
   Terminal Access Controller Access Control System (TACACS+).

5. The apparatus of claim 1, wherein said apparatus conveys said device management traffic that utilizes a protocol from a group of selected protocols and blocks said device management traffic that utilizes protocols not included in said group of selected protocols.

6. The apparatus of claim 1, wherein said in-band connection means conveys said device management traffic utilizing one or more of the protocols selected from the group comprising:
   Internet Protocol (IP);
   Transmission Control Protocol (TCP);
   User Datagram Protocol (UDP); and
   Internet Control Message Protocol (ICMP).

7. The apparatus of claim 6, wherein said apparatus secures said device management traffic conveyed over said in-band connection means utilizing one or more of the protocols selected from the group comprising:
   Internet Security protocol (IPSec); and
   Secure Socket Layer (SSL).

8. The apparatus of claim 7, wherein said out-of-band connection means conveys said device management traffic utilizing one or more of the protocols selected from the group comprising:
   Internet Protocol (IP);
   Transmission Control Protocol (TCP);
   User Datagram Protocol (UDP); and
   Internet Control Message Protocol (ICMP).

9. The apparatus of claim 8, wherein said apparatus secures said device management traffic conveyed over said out-of-band connection means utilizing one or more of the protocols selected from the group comprising:
   Internet Security protocol (IPSec); and
   Secure Socket Layer (SSL).

10. The apparatus of claim 2, wherein said dedicated management segment comprises a back-to-back Ethernet connection between said apparatus and said managed device.

11. The apparatus of claim 2, wherein said dedicated management segment comprises a switched infrastructure dedicated to management connections.

12. The apparatus of claim 2, wherein said dedicated management segment comprises a Virtual Local Area Network (VLAN) dedicated to management connections.

13. The apparatus of claim 1, wherein said communication network operatively coupled to said in-band connection means is selected from the group comprising:
   serial connection; and
   Local Area Network (LAN) connection.

14. The apparatus of claim 1, wherein said communication network operatively coupled to said out-of-band connection means is selected from the group comprising:
   Public Switched Telephone Network (PSTN);
   Digital Subscriber Line (DSL);
   Integrated Service Digital Network (ISDN);
   Local Area Network (LAN) connection; and
   Serial Connection.

15. The apparatus of claim 1, wherein said device management traffic is conveyed between said apparatus and an Access Control Server (ACS) for authentication of said management information communication partners.

16. The apparatus of claim 15, wherein said device management traffic can be conveyed over either said in-band connection means or said out-of-band connection means.

17. The apparatus of claim 1, wherein said device management traffic is conveyed between said apparatus and an Access Control Server (ACS) for authorization information concerning said management information communication partners.

18. The apparatus of claim 17, wherein said device management traffic can be conveyed over either said in-band connection means or said out-of-band connection means.

19. The apparatus of claim 1, wherein said apparatus monitors the status of one or more said in-band connection means and said apparatus reports on status changes of said in-band connection means by conveying the status change information over an available said in-band connection means or said out-of-band connection means to one or more said management information communication partners.

20. The apparatus of claim 1, wherein said apparatus monitors the status of one or more said out-of-band connection means and said apparatus reports on status changes of said out-of-band connection means by conveying the status change information over an available said in-band connection means or said out-of-band connection means to one or more said management information communication partners.

21. The apparatus of claim 1, wherein said apparatus monitors the status of one or more Public Switched Telephone Network (PSTN) connection means not in continuous use by periodically placing said PSTN connection means in an off-hook state and monitoring said PSTN connection means for dial-tone, and
   wherein, when said appliance does not detect said dial-tone when said appliance places said PSTN connection means in said off-hook state, said appliance conveys status information to one or more said management information communication partners utilizing an available said in-band connection means or said out-of-band connection means.

* * * * *